(12) United States Patent
Stojancic et al.

(10) Patent No.: US 11,594,028 B2
(45) Date of Patent: Feb. 28, 2023

(54) VIDEO PROCESSING FOR ENABLING SPORTS HIGHLIGHTS GENERATION

(71) Applicant: STATS LLC, Chicago, IL (US)

(72) Inventors: Mihailo Stojancic, San Jose, CA (US); Warren Packard, Palo Alto, CA (US); Dennis Kanygin, Sunnyvale, CA (US)

(73) Assignee: STATS LLC, Chicago, IL (US)

( * ) Notice: Subject to any disclaimer, the term of this patent is extended or adjusted under 35 U.S.C. 154(b) by 84 days.

(21) Appl. No.: 16/411,704

(22) Filed: May 14, 2019

(65) Prior Publication Data

US 2019/0354763 A1 Nov. 21, 2019

Related U.S. Application Data

(60) Provisional application No. 62/746,454, filed on Oct. 16, 2018, provisional application No. 62/712,041, (Continued)

(51) Int. Cl.
*G06V 20/40* (2022.01)
*G06T 7/12* (2017.01)
(Continued)

(52) U.S. Cl.
CPC ............ *G06V 20/42* (2022.01); *G06F 16/908* (2019.01); *G06T 7/12* (2017.01); *G06V 20/41* (2022.01);
(Continued)

(58) Field of Classification Search
CPC .......... H04N 21/435; H04N 21/44008; H04N 21/458; H04N 21/8133; H04N 21/84;
(Continued)

(56) References Cited

U.S. PATENT DOCUMENTS 6,005,562 A 12/1999 Shiga et al.
6,177,931 B1 1/2001 Alexander et al.
(Continued)

FOREIGN PATENT DOCUMENTS

CN 101650722 10/2011
CN 105912560 8/2016
(Continued)

OTHER PUBLICATIONS

US 10,462,538 B2, 10/2019, Packard et al. (withdrawn)
(Continued)

*Primary Examiner* — Amara Abdi
(74) *Attorney, Agent, or Firm* — DLA Piper LLP (US)

(57) ABSTRACT

One or more highlights of a video stream may be identified. The highlights may be segments of a video stream, such as a broadcast of a sporting event, that are of particular interest to one or more users. According to one method, at least a portion of the video stream may be stored. The portion of the video stream may be compared with templates of a template database to identify the one or more highlights. Each highlight may be a subset of the video stream that is deemed likely to match the one or more templates. The highlights, an identifier that identifies each of the highlights within the video stream, and/or metadata pertaining particularly to the one or more highlights may be stored to facilitate playback of the highlights for the users.

34 Claims, 16 Drawing Sheets

Related U.S. Application Data filed on Jul. 30, 2018, provisional application No. 62/680,955, filed on Jun. 5, 2018, provisional application No. 62/673,413, filed on May 18, 2018, provisional application No. 62/673,412, filed on May 18, 2018, provisional application No. 62/673,411, filed on May 18, 2018.

(51) Int. Cl.
*H04N 21/435* (2011.01)
*H04N 21/44* (2011.01)
*H04N 21/458* (2011.01)
*H04N 21/81* (2011.01)
*H04N 21/84* (2011.01)
*G06F 16/908* (2019.01)
*G06V 30/148* (2022.01)
*G06V 40/20* (2022.01)

(52) U.S. Cl.
CPC .............. *G06V 20/46* (2022.01); *G06V 20/48* (2022.01); *G06V 30/153* (2022.01); *G06V 40/20* (2022.01); *H04N 21/435* (2013.01); *H04N 21/44008* (2013.01); *H04N 21/458* (2013.01); *H04N 21/8133* (2013.01); *H04N 21/84* (2013.01); *G06T 2207/20132* (2013.01); *G06V 20/44* (2022.01)

(58) Field of Classification Search
CPC ......... H04N 21/251; H04N 21/234336; H04N 21/23418; H04N 21/8549; G06K 9/00724; G06K 9/00718; G06K 9/344; G06K 9/3266; G06K 9/00342; G06K 9/00335; G06K 9/00744; G06K 9/00758; G06K 2009/00738; G06T 2207/20132; G06T 7/12; G06F 16/908; G06V 20/42; G06V 20/41; G06V 20/46; G06V 20/48; G06V 30/153; G06V 40/20; G06V 20/44; G06V 20/635; G06V 30/40; G06V 40/23
See application file for complete search history.

(56) References Cited

U.S. PATENT DOCUMENTS

| | | | |
|---|---|---|---|
| 6,185,527 B1 | 2/2001 | Petkovic et al. |
| 6,195,458 B1 | 2/2001 | Warnick et al. |
| 6,557,042 B1 | 4/2003 | He et al. |
| 6,681,396 B1 | 1/2004 | Bates et al. |
| 6,721,490 B1 | 4/2004 | Yao et al. |
| 6,954,611 B2 | 10/2005 | Hashimoto et al. |
| 7,174,512 B2 | 2/2007 | Martin et al. |
| 7,197,715 B1 | 3/2007 | Valeria |
| 7,386,217 B2 | 6/2008 | Zhang |
| 7,543,322 B1 | 6/2009 | Bhogal et al. |
| 7,633,887 B2 | 12/2009 | Panwar et al. |
| 7,646,962 B1 | 1/2010 | Ellis et al. |
| 7,680,894 B2 | 3/2010 | Diot et al. |
| 7,742,111 B2 | 6/2010 | Shiu et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,831,112 B2 | 11/2010 | Wang et al. |
| 7,849,487 B1 | 12/2010 | Vosseller |
| 7,929,808 B2 | 4/2011 | Seaman et al. |
| 8,024,753 B1 | 9/2011 | Kummer et al. |
| 8,046,798 B1 | 10/2011 | Schlack et al. |
| 8,079,052 B2 | 12/2011 | Chen et al. |
| 8,099,315 B2 | 1/2012 | Amento |
| 8,104,065 B2 | 1/2012 | Aaby et al. |
| 8,140,570 B2 | 3/2012 | Ingrassia et al. |
| 8,196,168 B1 | 6/2012 | Bryan et al. |
| 8,209,713 B1 | 6/2012 | Lai et al. |
| 8,296,797 B2 | 10/2012 | Olstad et al. |
| 8,296,808 B2 | 10/2012 | Hardacker et al. |
| 8,312,486 B1 | 11/2012 | Briggs et al. |
| 8,320,674 B2 | 11/2012 | Guillou et al. |
| 8,424,041 B2 | 4/2013 | Candelore et al. |
| 8,427,356 B1 | 4/2013 | Satish |
| 8,457,768 B2 | 6/2013 | Hammer et al. |
| 8,535,131 B2 | 9/2013 | Packard et al. |
| 8,595,763 B1 | 11/2013 | Packard et al. |
| 8,627,349 B2 | 1/2014 | Kirby et al. |
| 8,688,434 B1 | 4/2014 | Birnbaum et al. |
| 8,689,258 B2 | 4/2014 | Kemo |
| 8,702,504 B1 | 4/2014 | Hughes et al. |
| 8,713,008 B2 | 4/2014 | Negi |
| 8,752,084 B1 | 6/2014 | Lai et al. |
| 8,793,579 B2 | 7/2014 | Halliday et al. |
| 8,923,607 B1 | 12/2014 | Kwatra et al. |
| 8,966,513 B2 | 2/2015 | John et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,060,210 B2 | 6/2015 | Packard et al. |
| 9,066,156 B2 | 6/2015 | Kapa |
| 9,213,986 B1 | 12/2015 | Buchheit et al. |
| 9,251,853 B2 | 2/2016 | Jeong et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 9,451,202 B2 | 9/2016 | Beals |
| 9,565,474 B2 | 2/2017 | Petruzzelli et al. |
| 9,578,377 B1 | 2/2017 | Malik et al. |
| 9,583,149 B2 | 2/2017 | Stieglitz |
| 9,648,379 B2 | 5/2017 | Howcroft |
| 9,715,902 B2 | 7/2017 | Coviello et al. |
| 9,788,062 B2 | 10/2017 | Dimov et al. |
| 9,805,268 B2 | 10/2017 | Xing et al. |
| 9,888,279 B2 * | 2/2018 | Ishtiaq ............... H04N 21/4884 |
| 10,056,116 B2 | 8/2018 | Packard et al. |
| 10,297,287 B2 | 5/2019 | Maisenbacher et al. |
| 10,419,830 B2 | 9/2019 | Packard et al. |
| 10,433,030 B2 | 10/2019 | Packard et al. |
| 2001/0013123 A1 | 8/2001 | Freeman et al. |
| 2001/0026609 A1 | 10/2001 | Weinstein et al. |
| 2002/0041752 A1 | 4/2002 | Abiko et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0136528 A1 | 9/2002 | Dagtas |
| 2002/0157095 A1 | 10/2002 | Masumitsu et al. |
| 2002/0157101 A1 | 10/2002 | Schrader et al. |
| 2002/0174430 A1 | 11/2002 | Ellis et al. |
| 2002/0178444 A1 | 11/2002 | Trajkovic et al. |
| 2002/0180774 A1 | 12/2002 | Errico et al. |
| 2002/0194095 A1 | 12/2002 | Koren |
| 2003/0012554 A1 | 1/2003 | Zeidler et al. |
| 2003/0023742 A1 | 1/2003 | Allen et al. |
| 2003/0056220 A1 | 3/2003 | Thornton et al. |
| 2003/0063798 A1 | 4/2003 | Li et al. |
| 2003/0066077 A1 | 4/2003 | Gutta |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin |
| 2003/0177503 A1 * | 9/2003 | Sull .................. G06F 16/71 725/112 |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0003403 A1 | 1/2004 | Marsh |
| 2004/0041831 A1 | 3/2004 | Zhang |
| 2004/0167767 A1 | 8/2004 | Xiong et al. |
| 2004/0181807 A1 | 9/2004 | Theiste et al. |
| 2005/0005308 A1 | 1/2005 | Logan et al. |
| 2005/0015712 A1 | 1/2005 | Plastina |
| 2005/0030977 A1 | 2/2005 | Casev et al. |
| 2005/0044570 A1 | 2/2005 | Poslinski |

(56) References Cited

U.S. PATENT DOCUMENTS

| | | |
|---|---|---|
| 2005/0071865 A1 | 3/2005 | Martins |
| 2005/0071881 A1 | 3/2005 | Deshpande |
| 2005/0091690 A1 | 4/2005 | Delpuch et al. |
| 2005/0120368 A1 | 6/2005 | Goronzy et al. |
| 2005/0125302 A1 | 6/2005 | Brown et al. |
| 2005/0149965 A1 | 7/2005 | Neogi |
| 2005/0152565 A1 | 7/2005 | Jouppi et al. |
| 2005/0154987 A1 | 7/2005 | Otsuka et al. |
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 | 9/2006 | Proebstel |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0201764 A1 | 8/2007 | Jung et al. |
| 2007/0204302 A1 | 8/2007 | Calzone |
| 2007/0212023 A1 | 9/2007 | Whillock |
| 2007/0226766 A1 | 9/2007 | Poslinski et al. |
| 2007/0239856 A1 | 10/2007 | Abadir |
| 2007/0245379 A1 | 10/2007 | Agnihortri |
| 2007/0250777 A1 | 10/2007 | Chen et al. |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0064490 A1 | 3/2008 | Ellis |
| 2008/0086743 A1 | 4/2008 | Cheng et al. |
| 2008/0092168 A1 | 4/2008 | Logan et al. |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1 | 6/2008 | Collet et al. |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0175486 A1 | 7/2008 | Yamamoto |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244381 A1* | 10/2008 | Nicolaou ............... H04L 67/04 707/E17.121 |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0303942 A1 | 12/2008 | Chang et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel |
| 2009/0055385 A1 | 2/2009 | Jean et al. |
| 2009/0080857 A1 | 3/2009 | St. John-Larkin |
| 2009/0082110 A1 | 3/2009 | Relyea et al. |
| 2009/0102984 A1 | 4/2009 | Arlina et al. |
| 2009/0138902 A1 | 5/2009 | Kamen |
| 2009/0144777 A1 | 6/2009 | Mikami et al. |
| 2009/0158357 A1 | 6/2009 | Miller |
| 2009/0178071 A1 | 7/2009 | Whitehead |
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0282336 A1* | 11/2009 | Lindley ............... G06F 16/4393 715/716 |
| 2009/0293093 A1 | 11/2009 | Igarashi |
| 2009/0299824 A1 | 12/2009 | Barnes |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1 | 5/2010 | Vunic |
| 2010/0125864 A1 | 5/2010 | Dwyer et al. |
| 2010/0146560 A1 | 6/2010 | Bonfrer |
| 2010/0153856 A1 | 6/2010 | Russ |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue et al. |
| 2010/0251305 A1 | 9/2010 | Kimble et al. |
| 2010/0262986 A1 | 10/2010 | Adimatvam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0096228 A1 | 4/2011 | Deigmoeller et al. |
| 2011/0109801 A1 | 5/2011 | Thomas et al. |
| 2011/0138418 A1 | 6/2011 | Choi et al. |
| 2011/0161242 A1 | 6/2011 | Chung et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1 | 9/2011 | Packard et al. |
| 2011/0217024 A1 | 9/2011 | Schlieski et al. |
| 2011/0231887 A1 | 9/2011 | West |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis et al. |
| 2012/0052941 A1 | 3/2012 | Mo |
| 2012/0060178 A1 | 3/2012 | Minakuchi et al. |
| 2012/0082431 A1 | 4/2012 | Sengupta et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |

(56) References Cited

U.S. PATENT DOCUMENTS

| | | |
|---|---|---|
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman et al. |
| 2012/0278834 A1 | 11/2012 | Richardson |
| 2012/0278837 A1 | 11/2012 | Gurtis et al. |
| 2012/0284745 A1 | 11/2012 | Strange |
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack et al. |
| 2013/0050502 A1* | 2/2013 | Saito ............... G06T 7/20 348/169 |
| 2013/0055304 A1 | 2/2013 | Kirby et al. |
| 2013/0061313 A1 | 3/2013 | Cullimore et al. |
| 2013/0073473 A1 | 3/2013 | Heath |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0138435 A1 | 5/2013 | Weber |
| 2013/0138693 A1 | 5/2013 | Sathish et al. |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1 | 8/2013 | Beining et al. |
| 2013/0251331 A1 | 9/2013 | Sambongi |
| 2013/0263189 A1 | 10/2013 | Garner |
| 2013/0268620 A1 | 10/2013 | Osminer |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |
| 2013/0325869 A1 | 12/2013 | Reiley et al. |
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0016864 A1* | 1/2014 | Chattopadhyay .... G06V 10/751 382/218 |
| 2014/0023348 A1 | 1/2014 | O'Kelly et al. |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1 | 3/2014 | Archibong |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1 | 3/2014 | Shah |
| 2014/0082670 A1 | 3/2014 | Papish |
| 2014/0088952 A1 | 3/2014 | Fife et al. |
| 2014/0111542 A1* | 4/2014 | Wan ............... G06K 9/3258 345/633 |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0130094 A1 | 5/2014 | Kirby et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatvam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0219524 A1* | 8/2014 | Takeguchi ............ G16H 50/30 382/128 |
| 2014/0223479 A1 | 8/2014 | Krishnamoorthi et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0298378 A1 | 10/2014 | Kelley |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0054975 A1* | 2/2015 | Emmett ............... G06V 30/40 348/220.1 |
| 2015/0058890 A1 | 2/2015 | Kapa |
| 2015/0082172 A1 | 3/2015 | Shakib et al. |
| 2015/0095932 A1 | 4/2015 | Ren |
| 2015/0106842 A1* | 4/2015 | Lee ............... H04N 21/2353 725/32 |
| 2015/0110461 A1 | 4/2015 | Maisenbacher et al. |
| 2015/0110462 A1 | 4/2015 | Maisenbacher et al. |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0243326 A1 | 8/2015 | Pacurariu et al. |
| 2015/0249803 A1 | 9/2015 | Tozer et al. |
| 2015/0249864 A1 | 9/2015 | Tang et al. |
| 2015/0281778 A1 | 10/2015 | Xhafa et al. |
| 2015/0310725 A1 | 10/2015 | Koskan et al. |
| 2015/0310894 A1 | 10/2015 | Stieglitz |
| 2015/0334461 A1 | 11/2015 | Yu |
| 2015/0358687 A1 | 12/2015 | Kummer |
| 2015/0358688 A1 | 12/2015 | Kummer |
| 2016/0014482 A1* | 1/2016 | Chen ............... H04N 21/8456 386/241 |
| 2016/0066020 A1 | 3/2016 | Mountain |
| 2016/0066026 A1 | 3/2016 | Mountain |
| 2016/0066042 A1 | 3/2016 | Dimov et al. |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli |
| 2016/0105708 A1 | 4/2016 | Packard et al. |
| 2016/0105733 A1 | 4/2016 | Packard et al. |
| 2016/0105734 A1 | 4/2016 | Packard et al. |
| 2016/0191147 A1 | 6/2016 | Martch |
| 2016/0198229 A1 | 7/2016 | Keipert |
| 2016/0261894 A1* | 9/2016 | Li ............... G06V 20/46 |
| 2016/0261929 A1* | 9/2016 | Lee ............... G06K 9/00724 |
| 2016/0309212 A1 | 10/2016 | Martch et al. |
| 2017/0054982 A1* | 2/2017 | Vellore Arumugam ............... H04N 19/17 |
| 2017/0164055 A1* | 6/2017 | Sohn ............... H04N 21/64784 |
| 2017/0347014 A1* | 11/2017 | Chien ............... H04N 13/254 |
| 2018/0014072 A1 | 1/2018 | Dimov et al. |
| 2018/0157321 A1* | 6/2018 | Liu ............... H04L 12/1827 |
| 2018/0204597 A1* | 7/2018 | Rav-Acha ......... H04N 21/23439 |
| 2019/0238952 A1* | 8/2019 | Boskovich ............ G06F 16/433 |
| 2019/0289372 A1* | 9/2019 | Merler ............... H04N 21/251 |

FOREIGN PATENT DOCUMENTS

| | | |
|---|---|---|
| EP | 1469476 | 10/2004 |
| EP | 1865716 | 12/2007 |
| EP | 2902568 | 12/2007 |
| EP | 2107477 | 10/2009 |
| EP | 2309733 | 4/2011 |
| EP | 2403239 | 1/2012 |
| EP | 2464138 | 6/2012 |

(56) References Cited

FOREIGN PATENT DOCUMENTS

| | | |
|---|---|---|
| JP | 10322622 | 12/1998 |
| JP | 2001251581 | 9/2001 |
| JP | 2004072540 | 3/2004 |
| JP | 2004260297 | 9/2004 |
| JP | 2005-317165 | 11/2005 |
| JP | 2006211311 | 8/2006 |
| JP | 2006-245745 | 9/2006 |
| JP | 2006333451 | 12/2006 |
| JP | 2007202206 | 8/2007 |
| JP | 2008167019 | 7/2008 |
| JP | 2012-029150 | 2/2012 |
| JP | 5034516 | 9/2012 |
| JP | 2013-175854 | 9/2013 |
| JP | 2014-157460 | 8/2014 |
| JP | 2014187687 | 10/2014 |
| KR | 2004-0025073 | 3/2004 |
| KR | 2006-0128295 | 12/2006 |
| WO | 9837694 | 8/1998 |
| WO | 0243353 | 5/2002 |
| WO | 2005059807 | 6/2005 |
| WO | 2007064987 | 6/2007 |
| WO | 2007098067 | 8/2007 |
| WO | 2009073925 | 6/2009 |
| WO | 2011040999 | 4/2011 |
| WO | 2013016626 | 1/2013 |
| WO | 2013166456 | 11/2013 |
| WO | 2014072742 | 5/2014 |
| WO | 2014164782 | 10/2014 |
| WO | 2014179017 | 11/2014 |
| WO | 2016030380 | 3/2016 |
| WO | 2016030384 | 3/2016 |
| WO | 2016030477 | 3/2016 |
| WO | 2016033545 | 3/2016 |
| WO | 2016034899 | 3/2016 |
| WO | 2016055761 | 4/2016 |
| WO | 2016057416 | 4/2016 |
| WO | 2016057844 | 4/2016 |

OTHER PUBLICATIONS

Assfalg et al, ("Highlight extraction in soccer videos", IEEE 2003) (Year: 2003).*
Song et al, ("Unified Sports Video Highlight Detection Based on Multi-feature Fusion", IEEE 2009) (Year: 2009).*
Miyamori, Hisashi "Automatic Generation of Personalized Digest Based on Context Flow and Distinctive Events", IEICE Technical Report, Jul. 10, 2003, vol. 103, No. 209, pp. 35-40.
Boxfish/TV's API; www.boxfish.com, (retrieved Mar. 28, 2017), 5 pages.
International Search Report for PCT/US2014/060651 dated Jan. 19, 2015 (9 pages).
International Search Report for PCT/US2014/060649 dated Jan. 8, 2015 (9 pages).
Jin, S.H., et al., "Intelligent broadcasting system and services for personalized semantic contents consumption", Expert Systems with Applications, Oxford, GB, vol. 31, No. 1, Jul. 1, 2006, pp. 164-173.
Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.
Thuuz Sports, "Frequently Asked Questions", www.thuuz.com/faq/, (retrieved Mar. 28, 2017), 5 pages.
R. Natarajan et al. "Audio-Based Event Detection in Videos—A Comprehensive Survey", Int. Journal of Engineering and Technology, vol. 6 No. 4 Aug.-Sep. 2014.
Q. Huang et al. "Hierarchical Language Modeling for Audio Events Detection in a Sports Game", IEEE International Conference on Acoustics, Speech and Signal Processing, 2010.
"Q. Huang et al. "Inferring the Structure of a Tennis Game Using Audio Information ", IEEE Trans. on Audio Speech and Language Proc., Oct. 2011."
M. Baillie et al. "Audio-based Event Detection for Sports Video", International Conference on Image and Video, CIVR 2003.
Y. Rui et al. "Automatically Extracting Highlights for TV Baseball Programs", Proceedings of the eighth ACM International conference on Multimedia, 2000.
D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.
E. Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), pp. 20-23, 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevsky et al. "ImageNet Classification with Deep Convolutional Neural Networks", In Proc. NIPS, pp. 1097-1105, 2012.
D. A. Sadlier et al. "Event Detection in Field Sports Video Using Audio-Visual Features and a Support Vector Machine", IEEE Trans. on Circuits and Systems for Video Technology, vol. 15, No. 10, Oct. 2005.
P. F. Felzenszwalb et al. "Efficient Graph-Based Image Segmentation", International Journal of Computer Vision, Sep. 2004, vol. 59, Issue 2, pp. 167-181.
C. J. C. Burges "A Tutorial on Support Vector Machines for Pattern Recognition", Springer, Data Mining and Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 7700, Springer, 2012.
L. Neumann, J. Matas, "Real-Time Scene Text Localization and Recognition", 5th IEEE Conference on Computer Vision and Pattern Recognition, Jun. 2012.
R. Smith "An Overview of the Tesseract OCR Engine", International Conference on Document Analysis and Recognition (ICDAR), 2007.
M. Merler, et al., "The Excitement of Sports: Automatic Highlights Using Audio/Visual Cues", Dec. 31, 2017, pp. 2520-2523.
H. Harb, et al., Highlights Detection in Sports Videos Based on Audio Analysis, pp. 1-4, Sep. 2009.
J. Ye, et al., Audio-Based Sports Highlight Detection by Fourier Local-Auto-Correlations, 11th Annual Conference of the International Speech Communication Association, Sep. 2010, pp. 2198-2201.

* cited by examiner

VIDEO PROCESSING FOR ENABLING SPORTS HIGHLIGHTS GENERATION

CROSS-REFERENCE TO RELATED APPLICATIONS

The present application claims the benefit of U.S. Provisional Application Ser. No. 62/673,411 for "Video Processing for Enabling Sports Highlights Generation", filed May 18, 2018, which is incorporated herein by reference in its entirety.

The present application claims the benefit of U.S. Provisional Application Ser. No. 62/673,412 for "Machine Learning for Recognizing and Interpreting Embedded Information Card Content", filed May 18, 2018, which is incorporated herein by reference in its entirety.

The present application claims the benefit of U.S. Provisional Application Ser. No. 62/673,413 for "Video Processing for Embedded Information Card Localization and Content Extraction", filed May 18, 2018, which is incorporated herein by reference in its entirety.

The present application claims the benefit of U.S. Provisional Application Ser. No. 62/680,955 for "Audio Processing for Detecting Occurrences of Crowd Noise in Sporting Event Television Programming", filed Jun. 5, 2018, which is incorporated herein by reference in its entirety.

The present application claims the benefit of U.S. Provisional Application Ser. No. 62/712,041 for "Audio Processing for Extraction of Variable Length Disjoint Segments from Television Signal", filed Jul. 30, 2018, which is incorporated herein by reference in its entirety.

The present application claims the benefit of U.S. Provisional Application Ser. No. 62/746,454 for "Audio Processing for Detecting Occurrences of Loud Sound Characterized by Short-Time Energy Bursts", filed Oct. 16, 2018, which is incorporated herein by reference in its entirety.

The present application is related to U.S. Utility application Ser. No. 13/601,915 for "Generating Excitement Levels for Live Performances," filed Aug. 31, 2012 and issued on Jun. 16, 2015 as U.S. Pat. No. 9,060,210, which is incorporated by reference herein in its entirety.

The present application is related to U.S. Utility application Ser. No. 13/601,927 for "Generating Alerts for Live Performances," filed Aug. 31, 2012 and issued on Sep. 23, 2014 as U.S. Pat. No. 8,842,007, which is incorporated by reference herein in its entirety.

The present application is related to U.S. Utility application Ser. No. 13/601,933 for "Generating Teasers for Live Performances," filed Aug. 31, 2012 and issued on Nov. 26, 2013 as U.S. Pat. No. 8,595,763, which is incorporated by reference herein in its entirety.

The present application is related to U.S. Utility application Ser. No. 14/510,481 for "Generating a Customized Highlight Sequence Depicting an Event", filed Oct. 9, 2014, which is incorporated by reference herein in its entirety.

The present application is related to U.S. Utility application Ser. No. 14/710,438 for "Generating a Customized Highlight Sequence Depicting Multiple Events", filed May 12, 2015, which is incorporated by reference herein in its entirety.

The present application is related to U.S. Utility application Ser. No. 14/877,691 for "Customized Generation of Highlight Show with Narrative Component", filed Oct. 7, 2015, which is incorporated by reference herein in its entirety.

The present application is related to U.S. Utility application Ser. No. 15/264,928 for "User Interface for Interaction with Customized Highlight Shows", filed Sep. 14, 2016, which is incorporated by reference herein in its entirety.

The present application is related to U.S. Utility application Ser. No. 16/411,710 for "Machine Learning for Recognizing and Interpreting Embedded Information Card Content", filed on the same date as the present application, which is incorporated by reference herein in its entirety.

The present application is related to U.S. Utility application Ser. No. 16/411,713 for "Video Processing for Embedded Information Card Localization and Content Extraction", filed on the same date as the present application, which is incorporated by reference herein in its entirety.

TECHNICAL FIELD

The present document relates to techniques for identifying multimedia content and associated information on a television device or a video server delivering multimedia content, and enabling embedded software applications to utilize the multimedia content to provide content and services synchronously with delivery of the multimedia content. Various embodiments relate to methods and systems for providing automated video and audio analysis that are used to identify and extract important event-based video segments in sports television video content, to create video highlights, and to associate metadata with such highlights for pre-game, in-game and post-game review.

DESCRIPTION OF THE RELATED ART

Enhanced television applications such as interactive advertising and enhanced program guides with pre-game, in-game and post-game interactive applications have long been envisioned. Existing cable systems that were originally engineered for broadcast television are being called on to support a host of new applications and services including interactive television services and enhanced (interactive) programming guides.

Some frameworks for enabling enhanced television applications have been standardized. Examples include the OpenCable™ Enhanced TV Application Messaging Specification, as well as the Tru2way specification, which refer to interactive digital cable services delivered over a cable video network and which include features such as interactive program guides, interactive ads, games, and the like. Additionally, cable operator "OCAP" programs provide interactive services such as e-commerce shopping, online banking, electronic program guides, and digital video recording. These efforts have enabled the first generation of video-synchronous applications, synchronized with video content delivered by the programmer/broadcaster, and providing added data and interactivity to television programming.

Recent developments in video/audio content analysis technologies and capable mobile devices have opened up an array of new possibilities in developing sophisticated applications that operate synchronously with live TV programming events. These new technologies and advances in computer vision and video processing, as well as improved computing power of modern processors, allow for real-time generation of sophisticated programming content highlights accompanied by metadata.

SUMMARY

Exemplary systems and methods are presented to enable generation of highlights of television broadcasting of sporting events on a television set, television set-top box (STB), digital video recorder (DVR) associated with a television STB, mobile device capable of receiving programming feed, other computing device, and/or the like. In at least one embodiment, the highlights can be identified synchronously while programming content is being presented.

In at least one embodiment, decoded video frames are processed to automatically detect replay (video repeat) of video sequences that include a sequence of network and/or team logos, and to automatically associate these sequences with time-based rich metadata containing textual and/or audiovisual information.

In another embodiment, an automated process is provided for receiving a digital video stream, analyzing one or more frames of the digital video stream, and recognizing and extracting sports reporting video segments and reactions of coaches and players in television broadcasting of sporting events. The analysis, recognition, and extraction steps may be based on in-frame network logos and/or detected and recognized faces of anchors, newscasters, commentators, fans, and/or celebrity athletes.

In yet another embodiment, characteristic repetitive strings of text (such as text boxes associated with television network identifiers and/or banners appearing in sporting event reporting newsrooms) are detected and used to delineate and extract highlights in television broadcasting of sporting events. The highlight identification application and associated streaming process may further provide for post-game parsing of one or more generated data files, extracting event boundaries from one or more data files, and/or automatically creating custom video content as a set of highlights of television programming content accompanied with rich text and audiovisual metadata.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

Definitions

Figure 1A:
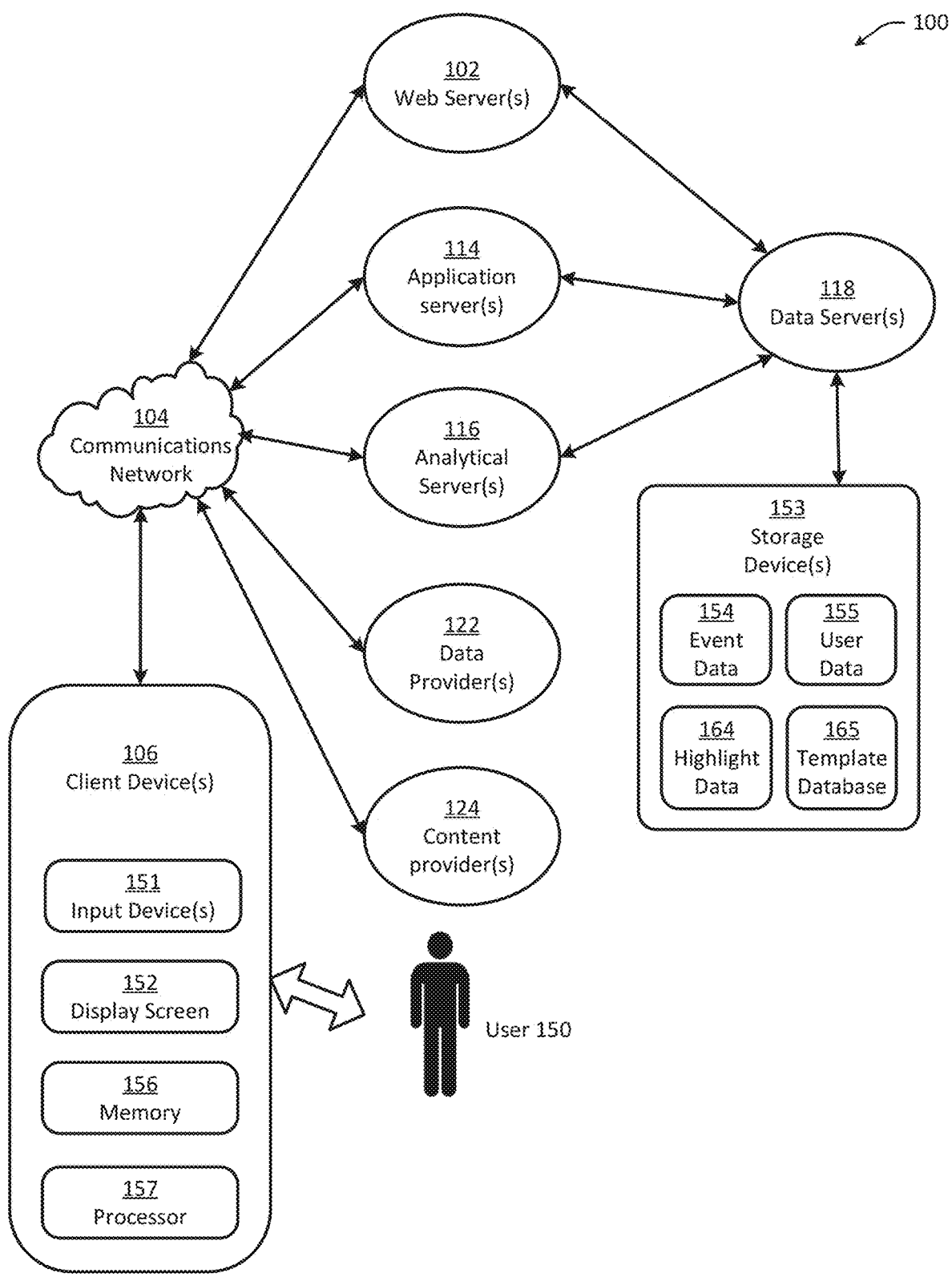
FIG. 1A is a block diagram depicting a hardware architecture according to a client/server embodiment, wherein event content is provided via a network-connected content provider.

The following definitions are presented for explanatory purposes only, and are not intended to limit scope.

Event: For purposes of the discussion herein, the term "event" refers to a game, session, match, series, performance, program, concert, and/or the like, or portion thereof (such as an act, period, quarter, half, inning, scene, chapter, or the like). An event may be a sporting event, entertainment event, a specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight shows for any audiovisual, audio, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.

Highlight: An excerpt or portion of an event, or of content associated with an event, that is deemed to be of particular interest to one or more users. A highlight can be of any length. In general, the techniques described herein provide mechanisms for identifying and presenting a set of customized highlights (which may be selected based on particular characteristics and/or preferences of the user) for any suitable event. "Highlight" can also be used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the video stream depicting the event itself), or retrieved from any number of other sources. Different types of highlights can be provided, including for example, occurrences (plays), strings, possessions, and sequences, all of which are defined below. Highlights need not be of fixed duration, but may incorporate a start offset and/or end offset, as described below.

Content Delineator: One or more video frames that indicate where a video sequence of interest, such as a highlight, may begin or end. One example of a content delineator is a transition frame (or frames) indicating a transition, for example from live footage to a replay or vice versa.

Occurrence: Something that takes place during an event. Examples include: a goal, a play, a down, a hit, a save, a shot on goal, a basket, a steal, a snap or attempted snap, a near-miss, a fight, a beginning or end of a game, quarter, half, period, or inning, a pitch, a penalty, an injury, a dramatic incident in an entertainment event, a song, a solo, and/or the like. Occurrences can also be unusual, such as a power outage, an incident with an unruly fan, and/or the like. Detection of such occurrences can be used as a basis for determining whether or not to designate a particular portion of a video stream as a highlight. Occurrences are also referred to herein as "plays", for ease of nomenclature, although such usage should not be construed to limit scope. Occurrences may be of any length, and the representation of an occurrence may be of varying length. For example, as mentioned above, an extended representation of an occurrence may include footage depicting the period of time just before and just after the occurrence, while a brief representation may include just the occurrence itself. Any intermediate representation can also be provided. In at least one embodiment, the selection of a duration for a representation of an occurrence can depend on user preferences, available time, determined level of excitement for the occurrence, importance of the occurrence, and/or any other factors.

Offset: The amount by which a highlight length is adjusted. In at least one embodiment, a start offset and/or end offset can be provided, for adjusting start and/or end times of the highlight, respectively. For example, if a highlight depicts a goal, the highlight may be extended (via an end offset) for a few seconds so as to include celebrations and/or fan reactions following the goal. Offsets can be configured to vary automatically or manually, based for example on amount of time available for the highlight, importance and/or excitement level of the highlight, and/or any other suitable factors.

String: A series of occurrences that are somehow linked or related to one another. The occurrences may take place within a possession (defined below), or may span multiple possessions. The occurrences may take place within a sequence (defined below), or may span multiple sequences. The occurrences can be linked or related because of some thematic or narrative connection to one another, or because one leads to another, or for any other reason. One example of a string is a set of passes that lead to a goal or basket. This is not to be confused with a "text string," which has the meaning ordinarily ascribed to it in the computer programming arts.

Possession: Any time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, a possession is defined as a half-inning. For football, a possession can include a number of sequences in which the same team has the ball. For other types of sporting events as well as for non-sporting events, the term "possession" may be somewhat of a misnomer, but is still used herein for illustrative purposes. Examples in a non-sporting context may include a chapter, scene, act, television segment, or the like. For example, in the context of a music concert, a possession may equate to performance of a single song. A possession can include any number of occurrences.

Sequence: A time-delimited portion of an event that includes one continuous time period of action. For example, in a sporting event, a sequence may begin when action begins (such as a face-off, tipoff, or the like), and may end when the whistle is blown to signify a break in the action. In a sport such as baseball or football, a sequence may be equivalent to a play, which is a form of occurrence. A sequence can include any number of possessions, or may be a portion of a possession.

Highlight show: A set of highlights that are arranged for presentation to a user. The highlight show may be presented linearly (such as a video stream), or in a manner that allows the user to select which highlight to view and in which order (for example by clicking on links or thumbnails). Presentation of highlight show can be non-interactive or interactive, for example allowing a user to pause, rewind, skip, fast-forward, communicate a preference for or against, and/or the like. A highlight show can be, for example a condensed game. A highlight show can include any number of contiguous or non-contiguous highlights, from a single event or from multiple events, and can even include highlights from different types of events (e.g. different sports, and/or a combination of highlights from sporting and non-sporting events).

User/viewer: The terms "user" or "viewer" interchangeably refer to an individual, group, or other entity that is watching, listening to, or otherwise experiencing an event, one or more highlights of an event, or a highlight show. The terms "user" or "viewer" can also refer to an individual, group, or other entity that may at some future time watch, listen to, or otherwise experience either an event, one or more highlights of an event, or a highlight show. The term "viewer" may be used for descriptive purposes, although the event need not have a visual component, so that the "viewer" may instead be a listener or any other consumer of content.

Narrative: A coherent story that links a set of highlight segments in a particular order.

Excitement level: An excitement level is a measure of how exciting or interesting an event or highlight is expected to be for a particular user or for users in general. Excitement levels can also be determined with respect to a particular occurrence or player. Various techniques for measuring or assessing excitement level are discussed in the above-referenced related applications. As discussed, excitement level can depend on occurrences within the event, as well as other factors such as overall context or importance of the event (playoff game, pennant implications, rivalries, and/or the like). In at least one embodiment, an excitement level can be associated with each occurrence, string, possession, or sequence within an event. For example, an excitement level for a possession can be determined based on occurrences that take place within that possession. Excitement level may be measured differently for different users (e.g. a fan of one team vs. a neutral fan), and it can depend on personal characteristics of each user.

Template Database: A database containing one or more templates.

Template: Text, image, video, audio, or audiovisual data that encapsulate indicators that a portion of a video stream is a highlight.

OVERVIEW

According to various embodiments, methods and systems are provided for automatically creating an array of video clips, together with time-based metadata associated with said video clips, that represent highlights from one or more video streams, such as one or more sports television programs. Such highlights and metadata can be extracted in real-time during television program playback, or during television program broadcast, such as a sporting event television program broadcast, and/or from stored content after initial broadcast of a television program.

In at least one embodiment, the system and method automatically detect replay (video repeat) of video sequences. In other embodiments, the system and method automatically detect anchors, commentators, and/or celebrity faces repetitively appearing in a broadcast content. In yet another embodiment, the system and method automatically detect characteristic sets of words (which may be, for example, arranged in sentences) that repetitively appear in broadcast content. Based on the results of such analysis of one or more video frames of a digital video stream, video sequences are automatically created containing highlights of the digital video stream content. In addition, data files are created associating identified highlights with audiovisual data and/or metadata.

In at least one embodiment, a software application operates synchronously with the broadcast of television programming content, to generate highlights and associated metadata information. Such software can run, for example, on the television device itself, or on an associated STB, or on a video server with the capability of receiving and subsequently streaming programming content, or on a mobile device equipped with the capability of receiving a video feed including live programming. In at least one embodiment, such a software application may return details about the highlighted video content to the user. In another embodiment, the software application may return a rich set of metadata with relevant information in addition to video highlights. For example, if a user is watching a sporting event, the system may automatically display information such as current league standings, or details on the players involved in the sporting event, or other information about the sporting event that might be relevant to the user.

In another embodiment, the software application may enhance the displayed program or content with additional biographical information and/or current news stories about players in the detected scenes. The software application may also enhance the displayed program or content with replays of sporting event programming, as well as with links to Internet videos that are related to the scenes being played, or the players in those scenes, and/or with any other information or content pertinent to the displayed program or content, or to a temporal segment thereof.

In video management and processing systems as well as in the context of an interactive (enhanced) programming guide, a set of video clips representing television broadcast content highlights can be automatically generated and/or stored in real-time, along with a database containing time-based metadata describing, in more detail, the events presented in the highlights. The metadata accompanying the video clips can include any information, such as for example textual information, images, and/or any type of audiovisual data. In this manner, interactive television applications can provide timely, relevant content to users who are watching programming content, either on a primary television display, or on a secondary display such as tablet, laptop or a smartphone.

Disclosed herein are exemplary embodiments for automatically creating an array of video clips and time-based metadata associated with such video clips representing highlights of television broadcasts of sporting events. These can include video clips generated during and/or after the television broadcast of a sporting event.

In at least one embodiment, during breaks in a sporting event being broadcast, viewers are provided with the ability to review highlights of the sporting event and/or replay exciting moments, commentaries, and/or reactions of participants and spectators. In at least one embodiment, viewers are provided with the ability to go back to previous exciting segments during the live media presentation, rehashing and reviewing what happened previously.

In at least one embodiment, in-game and post-game information is enhanced with summaries of video replays, and with presentation of players, coaches, and commentators reacting to exciting events. Real-time dynamic highlights, which can be generated by automatic replay sequence extraction and generation of associated metadata, are used to enhance different sports discovery experiences during and/or after the game. Key moments and thrilling highlights can instantly be made available for review by the viewer. Using the techniques described herein, a game can be tracked and exciting events presented as they happen following the game timeline, with generated markers of highlights. In addition, ads can be inserted before each video clip, so as to monetize sports content in an unobtrusive way.

In another embodiment, the system delivers links to over-the-top (OTT) highlights (and/or other content) by league, player, and/or season, by mapping play-by-play excitement rating to links to games available from other sources. Streaming media providers can use this functionality to enhance their sports content offerings, enabling a provider to offer cross-referenced metadata across sports television digital streams, thus powering the entire entertainment ecosystem with rich, real-time sporting event highlights and associated metadata.

The present document describes exemplary systems and methods for automatically detecting replay (video repeat) of video sequences and for generating time-based video metadata for broadcast video, as well as for video playback devices. Presented methods and systems provide for identification of a region, or multiple regions, in a sequence of a video that contains sports television network logo information, and/or playing team logo information, and processing those regions by using computer vision techniques to transform information from identified presence of logo images into video clips and associated metadata.

In at least one embodiment, the described methods and systems provide for identification of a region or multiple regions in the broadcast or streamed video that contain relevant information such as words appearing in analyzed video frames and/or certain video content of interest.

In another embodiment, the described methods and systems provide for identification of a region of multiple regions in the broadcast or streamed video that contain faces of sports television network commentators, anchors, fans, and/or celebrity players, appearing in analyzed video frames and delineating video content of interest.

These regions of interest in the video content are identified, recognized, and processed in real-time, using computer vision techniques, to transform information from identified images into a set of video clips and associated metadata describing the events of interest.

In some embodiments, the digital video stream can be a live broadcast stream. The system can include a client application that can automatically detect one or more desired highlight boundaries by using computer vision techniques to analyze individual video frames.

In at least one embodiment, the system includes an automated video system that can deliver the digital video stream via a computer server. Video highlights can be extracted in real-time and delivered to the client. The client and the server may be connected over any suitable electronic network, and the digital video stream may be streamed from the server to the client via the network.

In yet another embodiment, an automated process is performed, wherein a digital video stream is received, and wherein video frames of the digital video stream are analyzed for the presence of network or team logo information, as well as characteristic words, faces of anchors, commentators, and/or celebrities. Based on the results of such analysis of one or more video frames, the system automatically creates video sequences containing highlights, as well as a file associating identified video sequence boundaries with time boundaries, audiovisual data, and text metadata.

In various embodiments, a method may provide real-time generation and viewing of video highlights synchronously with respect to real-time broadcast of television programming. The method may include capturing television programming content, processing the captured television programming content, identifying a likely match for the captured television programming content in a template database, and providing matching timecodes and related video sequences corresponding to the matching timecodes to a video highlight generating application, to allow the application to perform actions that are synchronous with that content.

In at least one embodiment, the broadcast of television programming may be a digital video stream that the video highlight application can process, and from which the video highlight application can automatically detect one or more desired content highlight boundaries by using computer vision techniques to analyze video frames.

In at least one embodiment, an array of video clips and time-based metadata associated with these video clips may automatically be created during the television broadcast of a sporting event and/or after the television broadcast of a sporting event.

In at least one embodiment, automatic detection and extraction of video replays are performed by identifying a region or multiple regions in a sequence of a video that contains sports television network logo information and/or team logo information, and by processing those regions to transform information from the identified presence of logo images into video clips and associated metadata. In at least one embodiment, a template logo matching method is used for event boundary detection to determine whether sufficient similarity exists between the extracted logo image and one or more logo templates in a template database. In at least one embodiment, the logo templates are populated with selected network/team logos representing templates to be used for logo detection. In various embodiments, network logos delineating replay sequences are extracted from the entire video frame, or they are extracted from a portion of a video frame. In at least one embodiment, a template database with logo images/frames from multiple networks may be organized in a way that only one template database, for a known television programming network, is searched at any given time, so as to reduce template matching time.

In at least one embodiment, detection and extraction of video highlights may be performed by identifying a region or multiple regions in a sequence of video that contain faces of sports television network commentators, anchors, fans, and/or celebrity players, appearing in analyzed video frames and delineating video content of interest. In at least one embodiment, a template face matching method is used in event boundary detection to determine whether sufficient similarity exists between the extracted normalized face image and the one or more face templates. In at least one embodiment, the template database is populated with selected normalized face images of celebrity players, coaches, anchors, fans, and/or commentators. In at least one embodiment, face-bounding quadrilaterals are resized and normalized to standard size and standard illumination. In at least one embodiment, selected face images of celebrity players, coaches, anchors, fans, and/or commentators can contain a plurality of views.

In at least one embodiment, automatic detection and extraction of video highlights may be performed by identifying a region or multiple regions in a sequence of video that contain a set of words associated with a sports television network, and that appear repetitively in analyzed video frames, so as to delineate video content of interest. In at least one embodiment, a template text matching method is used in event boundary detection to determine whether sufficient similarity exists between the extracted normalized text image and the one or more text templates. In at least one embodiment, the text templates are populated with selected normalized repetitive text-box images associated with network identifiers and/or banners appearing in sporting event reporting newsrooms. In at least one embodiment, selected text images are resized and normalized to a standard size and standard illumination. In at least one embodiment, selected text images can contain a plurality of views.

In at least one embodiment, the application may deliver links to over-the-top (OTT) highlights (and/or other content) by league, player, and/or season, by mapping play-by-play excitement ratings to links to games available from other sources.

In at least one embodiment, the highlighted television programming event data may be transmitted to a mobile device via a TCP/IP (or other) network, the highlighted programming event data containing at least the sequence of detected highlighted video content, the matching times, and related metadata.

In at least one embodiment, template matching may be used in the event boundary detection, which may utilize Peak Signal-to-Noise Ratio (PSNR) computation (or some other computation method) to determine whether sufficient similarity exists between the extracted image and a template image.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box ("STB"), game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Referring now to FIG. 1A, there is shown a block diagram depicting hardware architecture of a system 100 for automatically identifying highlights of a video stream of an event, according to a client/server embodiment. Event content, such as the video stream, may be provided via a network-connected content provider 124. An example of such a client/server embodiment is a web-based implementation, wherein each of one or more client devices 106 runs a browser or app that provides a user interface for interacting with content (such as web pages, video content, television programs, and/or the like) from various servers 102, 114, 116, as well as data provider(s) 122, and/or content provider(s) 124, provided to client device 106 via communications network 104. Transmission of content and/or data in response to requests from client device 106 can take place using any known protocols and languages, such as Hypertext Markup Language (HTML), Java, Objective C, Python, JavaScript, and/or the like.

Client device 106 can be any electronic device, such as a desktop computer, laptop computer, television, smartphone, tablet, music player, audio device, kiosk, set-top box, game system, wearable device, consumer electronic device, and/or the like. In at least one embodiment, client device 106 has a number of hardware components well known to those skilled in the art. Input device(s) 151 can be any component(s) that receive input from user 150, including, for example, a handheld remote control, keyboard, mouse, stylus, touchsensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 152 can be any component that graphically displays information, video, content, and/or the like, including depictions of events, highlights, and/or the like. Such output may also include, for example, audiovisual content, data visualizations, navigational elements, graphical elements, queries requesting information and/or parameters for selection of content, or the like. In at least one embodiment, where only some of the desired output is presented at a time, a dynamic control, such as a scrolling mechanism, may be available via input device(s) 151 to choose which information is currently displayed, and/or to alter the manner in which the information is displayed.

Processor 157 can be a conventional microprocessor for performing operations on data under the direction of software, according to well-known techniques. Memory 156 can be random-access memory, having a structure and architecture as are known in the art, for use by processor 157 in the course of running software for performing the operations described herein. Client device can also include local storage (not shown), which may be a hard drive, flash drive, optical or magnetic storage device, web-based (cloud-based) storage, and/or the like.

Any suitable type of communications network 104, such as the Internet, a television network, a cable network, a cellular network, and/or the like can be used as the mechanism for transmitting data between client device 106 and various server(s) 102, 114, 116 and/or content provider(s) 124 and/or data provider(s) 122, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 106 transmits requests for data and/or content via communications network 104, and receives responses from server(s) 102, 114, 116 containing the requested data and/or content.

In at least one embodiment, the system of FIG. 1A automatically identifies highlights for sporting events; however, the teachings herein apply to non-sporting events as well, and it is to be appreciated that the technology described herein is not limited to application to sporting events. For example, the technology described herein can be utilized to automatically identify highlights for a television show, movie, news event, game show, political action, business show, drama, and/or other episodic content, or for more than one such event.

In at least one embodiment, system 100 identifies highlights of broadcast events by analyzing a video stream of the event. This analysis may be carried out in real-time. In one embodiment, system 100 includes one or more web server(s) 102 coupled via a communications network 104 to one or more client devices 106. Communications network 104 may be a public network, a private network, or a combination of public and private networks such as the Internet. Communications network 104 can be a LAN, WAN, wired, wireless and/or combination of the above. Client device 106 is, in at least one embodiment, capable of connecting to communications network 104, either via a wired or wireless connection. In at least one embodiment, client device may also include a recording device capable of receiving and recording events, such as a DVR, PVR, or other media recording device. Such recording device can be part of client device 106, or can be external; in other embodiments, such recording device can be omitted. Although FIG. 2A shows one client device 106, system 100 can be implemented with any number of client device(s) 106 of a single type or multiple types.

Web server(s) 102 may include one or more physical computing devices and/or software that can receive requests from client device(s) 106 and respond to those requests with data, as well as send out unsolicited alerts and other messages. Web server(s) 102 may employ various strategies for fault tolerance and scalability such as load balancing, caching and clustering. In at least one embodiment, web server(s) 102 may include caching technology, as known in the art, for storing client requests and information related to events.

Web server(s) 102 may maintain, or otherwise designate, one or more application server(s) 114 to respond to requests received from client device(s) 106. In at least one embodiment, application server(s) 114 provide access to business logic for use by client application programs in client device(s) 106. Application server(s) 114 may be co-located, co-owned, or co-managed with web server(s) 102. Application server(s) 114 may also be remote from web server(s) 102. In at least one embodiment, application server(s) 114 interact with one or more analytical server(s) 116 and one or more data server(s) 118 to perform one or more operations of the disclosed technology.

One or more storage devices 153 may act as a "data store" by storing data pertinent to operation of the system 100. This data may include, for example, and not by way of limitation, event data 154 pertinent to events such as sporting events, user data 155 pertinent to one or more users 150, highlight data 164 pertinent to one or more highlights of the event data 154, and/or a template database 165, which may be used to identify the highlights.

Event data 154 can include any information describing or depicting any number of events, as well as occurrences, excitement levels, video streams, categories, metadata, and/or other information. User data 155 can include any information describing users 150, including for example, demographics, purchasing behavior, video stream viewing behavior, interests, preferences, and/or the like. Highlight data 164 may include highlights, highlight identifiers, time indicators, categories, excitement levels, and other data pertaining to highlights. The template database 165 may include templates to be compared with a video stream to identify the highlights, as will be described subsequently. The event data 154, user data 155, highlight data 164, and template database 165 will be described subsequently in detail.

Notably, many components of the system 100 may be, or may include, computing devices. Such computing devices may each have an architecture similar to that of the client device 106, as shown and described above. Thus, any of the components, such as communications network 104, web servers 102, application servers 114, analytical servers 116, data providers 122, content providers 124, data servers 118, and storage devices 153, may include one or more computing devices, each of which may optionally have an input device 151, a display screen 152, memory 156, and/or a processor 157.

In an exemplary operation of system 100, one or more users 150 of client devices 106 view content from the content providers 124, in the form of video streams. The video streams may show events, such as sporting events. The video streams may be digital video streams that can readily be processed with known computer vision techniques.

As the video streams are displayed, one or more components of the system 100, such as client devices 106, web servers 102, application servers 114, and/or analytical servers 116, may analyze the video streams and identify highlights within the video streams. This analysis may be carried out in response to receipt of a request to identify highlights for the video stream. In another embodiment, highlights may be identified without a specific request having been made by user 150. In yet another embodiment, the analysis of video streams and identification of highlights within the video streams can take place without a video stream being displayed.

In one embodiment, user 150 can specify, via input device(s) 151 at client device 106, certain parameters for identification of the highlights (such as, for example, what event/games/teams to include, how much time the user 150 has available to view the highlights, and/or any other parameters). User preferences can also be extracted from storage, such as from user data 155 stored in one or more storage devices 153, so as to customize identification of the highlights without necessarily requiring user 150 to specify preferences. User preferences can be determined based on observed behavior and actions of user 150, for example, by observing website visitation patterns, television watching patterns, music listening patterns, online purchases, previous highlight identification parameters, highlights actually viewed by the user 150, and/or the like.

Additionally or alternatively, user preferences can be retrieved from previously stored preferences that were explicitly provided by user 150. Such user preferences may indicate which teams, sports, players, and/or types of events are of interest to user 150, and/or they may indicate what type of metadata or other information related to highlights, would be of interest to user 150. Such preferences can therefore be used to guide identification of highlights for the user 150.

Analytical server(s) 116, which may include one or more computing devices as described above, may analyze live and/or recorded feeds of playby-play statistics related to one or more events from data provider(s) 122. Examples of data provider(s) 122 may include, but are not limited to, providers of real-time sports information such as STATS™, Perform (available from Opta Sports of London, UK), and SportRadar of St. Gallen, Switzerland. In one embodiment, analytical server(s) 116 generate different sets of excitement levels for events; such excitement levels can then be stored in conjunction with highlights identified by the system 100 according to the techniques described herein.

Application server(s) 114 may analyze the video stream to identify the highlights. Additionally or alternatively, such analysis may be carried out by each of the client devices 106. The identified highlights may be specific to a user 150; in such case, it may be advantageous to identify the highlights in the client device 106 pertaining to the user 150. The client device 106 may receive, retain, and/or retrieve the applicable user preferences for highlight identification, as described above. Additionally or alternatively, highlight generation may carried out globally (i.e., using objective criteria applicable to the user population in general, without regard to preferences for a particular user 150). In such a case, it may be advantageous to identify the highlights in the application servers 114.

Content for which highlights are to be identified may come from any suitable source, including from content provider(s) 124, which may include websites such as YouTube, MLB.com, and the like; sports data providers; television stations; client- or server-based DVRs; and/or the like. Alternatively, content can come from a local source such as a DVR or other recording device associated with (or built into) client device 106. In at least one embodiment, application server(s) 114 makes the customized highlight show available to user 150, either as a download, or streaming content, or on-demand content, or in some other manner.

As mentioned above, it may be advantageous for user-specific highlight identification to be carried out at a client device 106 pertaining to that user 150. Such an embodiment may avoid the need for video content or other high-bandwidth content to be transmitted via communications network 104 unnecessarily, particularly if such content is already available at client device 106.

Figure 1B:
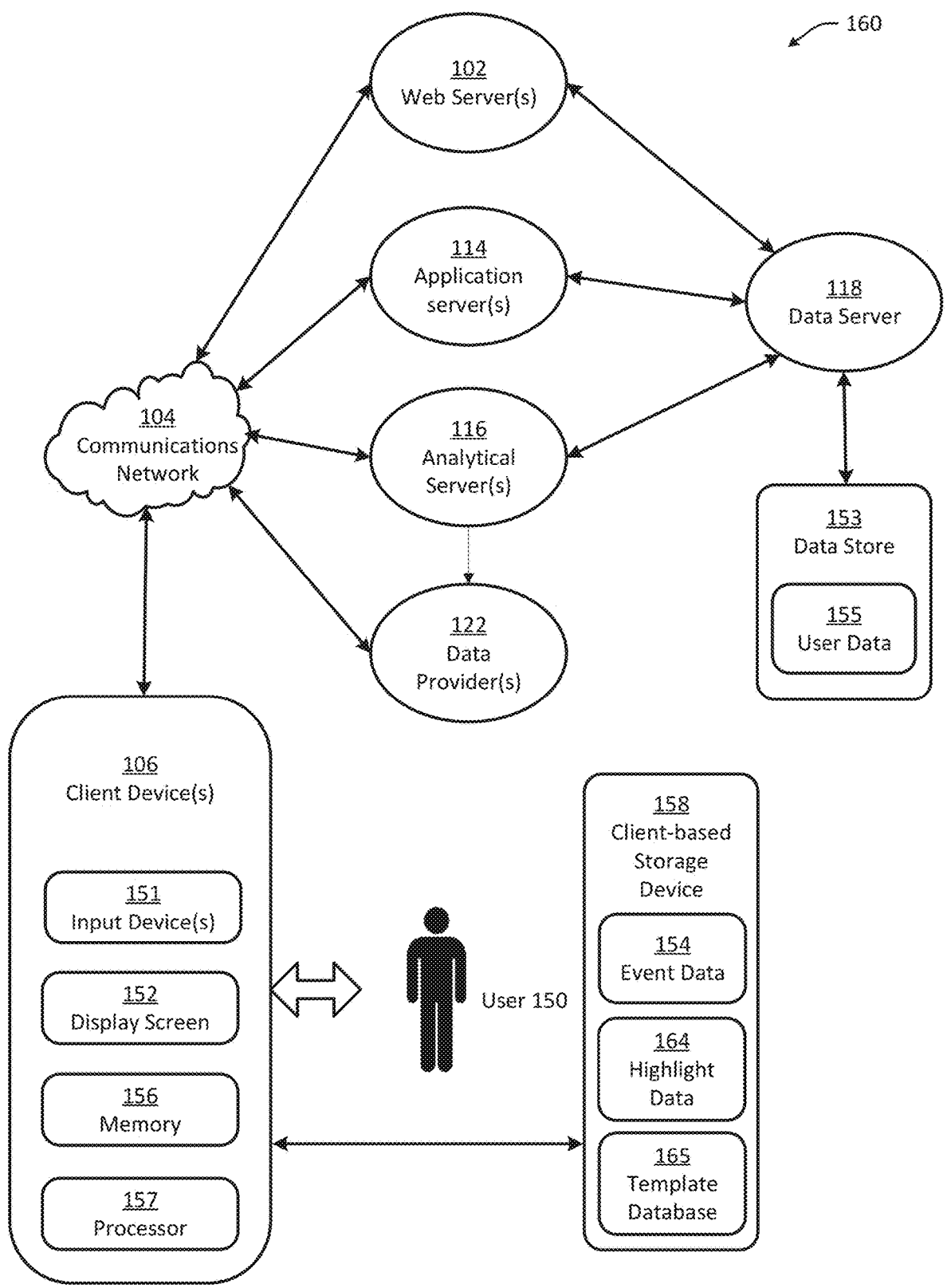
FIG. 1B is a block diagram depicting a hardware architecture according to another client/server embodiment, wherein event content is stored at a client-based storage device.

For example, referring now to FIG. 1B, there is shown an example of a system 160 according to an embodiment wherein at least some of the event data 154, highlight data 164, and template database 165 are stored at client-based storage device 158, which may be any form of local storage device available to client device 106. An example is a DVR on which events may be recorded, such as for example video content for a complete sporting event. Alternatively, client-based storage device 158 can be any magnetic, optical, or electronic storage device for data in digital form; examples include flash memory, magnetic hard drive, CD-ROM, DVD-ROM, or other device integrated with client device 106 or communicatively coupled with client device 106. Based on the information provided by application server(s) 114, client device 106 may identify highlights from event data 154 stored at client-based storage device 158 and store the highlights in the highlight data 164 without having to retrieve video content from a content provider 124 or other remote source. Such an arrangement can save bandwidth, and can usefully leverage existing hardware that may already be available to client device 106.

Returning to FIG. 1A, in at least one embodiment, application server(s) 114 may identify different highlights for different users 150, depending on individual user preferences and/or other parameters. The identified highlights may be presented to user 150 via any suitable output device, such as display screen 152 at client device 106. If desired, multiple highlights may be identified and compiled into a highlight show, which may be accessed via a menu, and/or assembled into a "highlight reel," or set of highlights, that plays for the user 150 according to a predetermined sequence. User 150 can, in at least one embodiment, control highlight playback via input device(s) 151, for example to:

select particular highlights for display;
pause, rewind, fast-forward;
skip forward to the next highlight;
return to the beginning of a previous highlight within the highlight show; and/or
perform other actions.

In at least one embodiment, one more data server(s) 118 are provided. Data server(s) 118 may respond to requests for data from any of server(s) 102, 114, 116, for example to obtain or provide event data 154, user data 155, highlight data 164, and/or the template database 165. In at least one embodiment, such information can be stored at any suitable storage device 153 accessible by data server 118, and can come from any suitable source, such as from client device 106 itself, content provider(s) 124, data provider(s) 122, and/or the like.

Figure 1C:
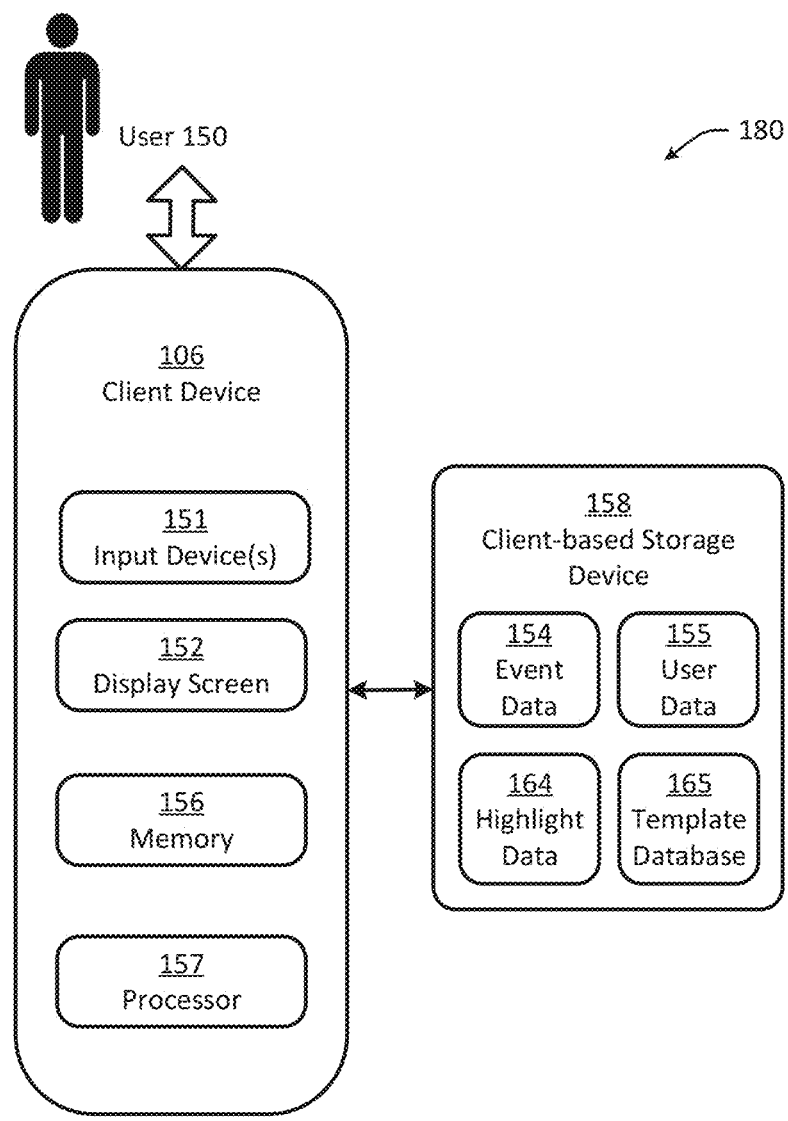
FIG. 1C is a block diagram depicting a hardware architecture according to a standalone embodiment.

Referring now to FIG. 1C, there is shown a system 180 according to an alternative embodiment wherein system 180 is implemented in a stand-alone environment. As with the embodiment shown in FIG. 1B, at least some of the event data 154, user data 155, highlight data 164, and template database 165 may be stored at a client-based storage device 158, such as a DVR or the like. Alternatively, client-based storage device 158 can be flash memory or a hard drive, or other device integrated with client device 106 or communicatively coupled with client device 106.

User data 155 may include preferences and interests of user 150. Based on such user data 155, system 100 may identify particular highlights within a set of event data 154, which may include one or more video streams of events, and thereby identify highlights to present to user 150 in the manner described herein. Additionally or alternatively, highlights may be identified based on objective criteria that are not based on information specific to user 150.

Figure 1D:
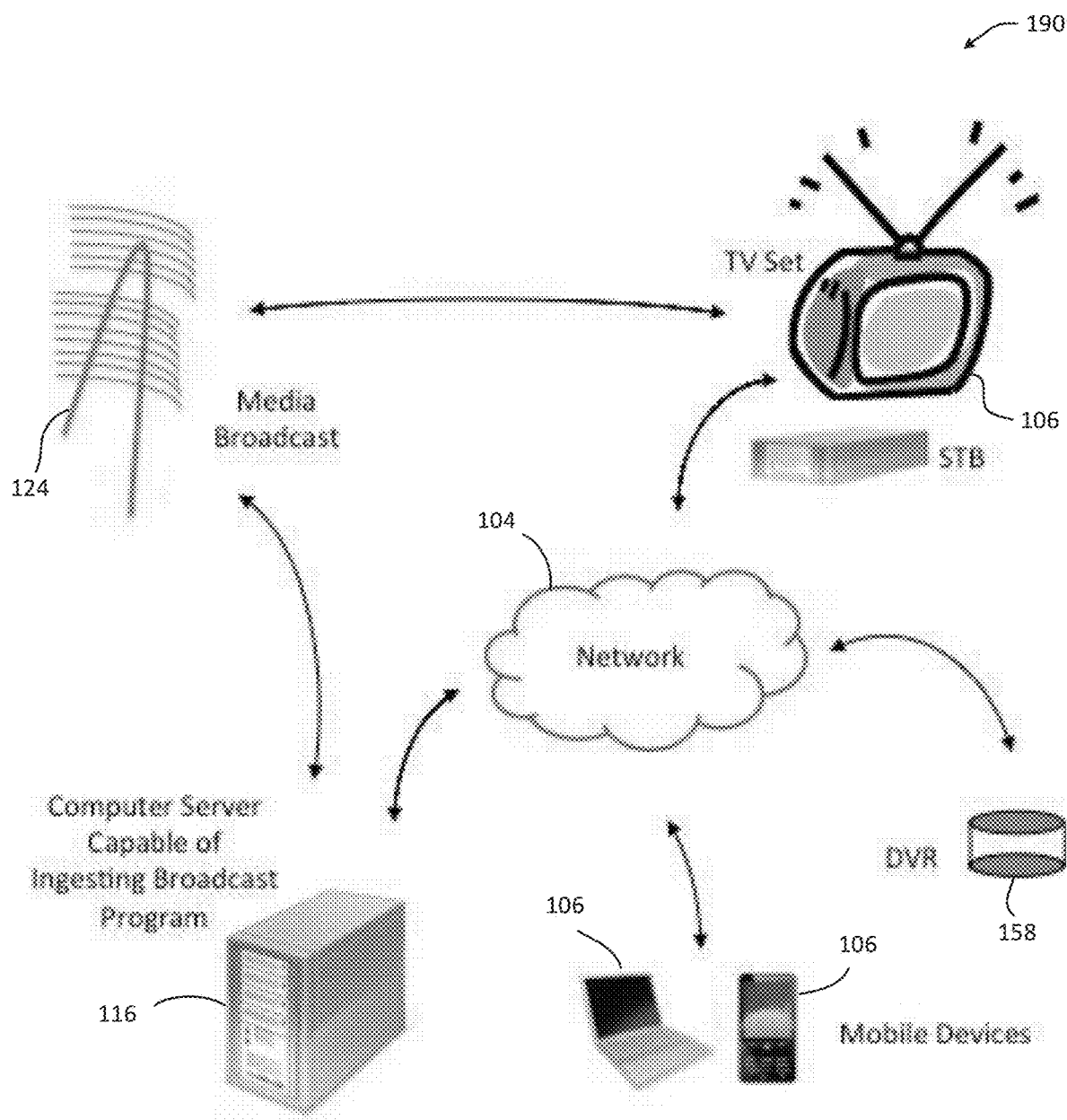
FIG. 1D is a block diagram depicting an overview of a system architecture, according to one embodiment.

Referring now to FIG. 1D, there is shown an overview of a system 190 with architecture according to an alternative embodiment. In FIG. 1D, the system 190 includes a broadcast device such as content providers 124, a content receiver in the form of a client device 106 such as a television set with a STB, a video server such as the analytical server(s) 116, capable of ingesting and streaming television programming content, and/or other client devices 106 such as a mobile device and a laptop, which are capable of receiving and processing television programming content, all connected via a network such as the communications network 104. A client-based storage device 158, such as a DVR, may be connected to any of the client devices 106 and may store a video stream, highlights, highlight identifiers, and/or metadata to facilitate identification and presentation of highlights via the client devices 106.

The specific hardware architectures depicted in FIGS. 1A, 1B, 1C, and 1D are merely exemplary. One skilled in the art will recognize that the techniques described herein can be implemented using other architectures. Many components depicted therein are optional and may be omitted, consolidated with other components, and/or replaced with other components.

In one embodiment, the system can be implemented as software written in any suitable computer programming language, whether in a stand-alone or client/server architecture. Alternatively, it may be implemented and/or embedded in hardware.

Data Structures

Figure 2:
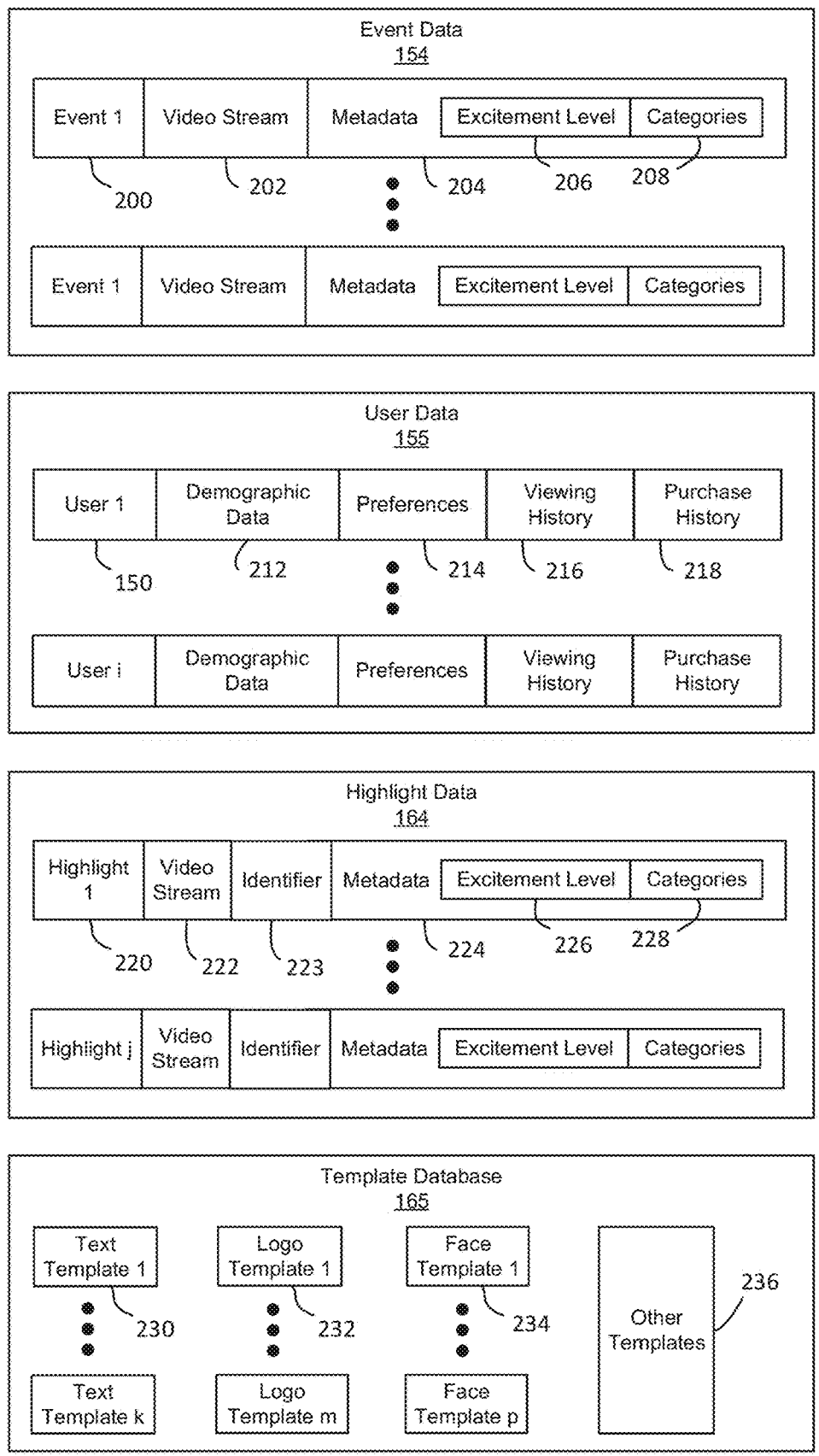
FIG. 2 is a schematic block diagram depicting examples of data structures that may be incorporated into the event data user data, highlight data, and template database, according to one embodiment.

FIG. 2 is a schematic block diagram depicting examples of data structures that may be incorporated into the event data 154 user data 155, highlight data 164, and template database 165, according to one embodiment.

As shown, event data 154 may include records for n events 200, each of which may include a video stream 202 and metadata 204 for a particular event 200. The video stream 202 may include video depicting part, or all, of the event 200, such as a broadcast television program of a sports game. The metadata 204 may include information about the event 200, such as the event date, season, and groups or individuals involved in the event or the video stream 202, such as teams, players, coaches, anchors, broadcasters, and fans, and/or the like.

Optionally, the metadata 204 may include an excitement level 206 and a one or more other categories 208. The excitement level 206 may be an indicator of how interested a particular user 150, or all users 150 in general, are likely to find the event 200 and/or the video stream 202. The excitement level 206 may be based on subjective and/or objective criteria.

Each category 208 may include any a league, player, or season pertaining to the event 200 and/or the video stream 202. Optionally, the categories 208 may include one or more categories based on the excitement level 206, such as range of excitement levels within which the event 200 and/or the video stream 202 falls. Thus, the events 200 and/or video streams 202 can easily be classified as more or less exciting to a particular user 150, or to all users 150.

The structure of the event data 154 set forth in FIG. 2 is merely exemplary; in some embodiments, excitement levels 206, categories 208, and/or other data may be broken out separately from the metadata 204. Further, in alternative embodiments, data not specifically described above may be incorporated into the event data 154.

As further shown, user data 155 may include records pertaining to i users 150, each of which may include demographic data 212, preferences 214, viewing history 216, and purchase history 218 for a particular user 150. Demographic data may include any type of demographic data, including but not limited to age, gender, location, nationality, religious affiliation, education level, and/or the like. Preferences 214 may include selections made by the user 150 regarding his or her preferences. Preferences 214 may relate directly to highlight identification and/or viewing, or may be more general in nature. In either case, preferences 214 may be used to facilitate identification and/or presentation of the highlights to the user 150. Viewing history 216 may list the television programs, video streams 202, highlights, web pages, search queries, and/or other content retrieved and/or viewed by the user 150. Purchase history 218 may list products or services purchased or requested by the user 150.

As further shown, highlight data 164 may be structured in a manner similar to event data 154. For example, highlight data 164 may include records for j highlights 220, each of which may include a video stream 222, an identifier, and/or metadata 224 for a particular highlight 220. The video stream 222 may include video depicting the highlight 220, which may be obtained from one or more video streams 202 of one or more events 200 (for example, by cropping the video stream 202 to include only the video stream 222 pertaining to the highlight 220). The identifier 223 may include time codes and/or other indicia that indicate where the highlight 220 resides within the video stream 202 of the event 200 from which it is obtained.

In some embodiments, the record for each of the highlights 220 may contain only one of the video stream 222 and the identifier 223. Highlight playback may be carried out by playing the video stream 222 for the user 150, or by using the identifier 223 to play only the highlighted portion of the video stream 202 for the event 200 from which the highlight 220 is obtained.

Like the metadata 204, the metadata 224 may include information about the highlight 220, such as the event date, season, and groups or individuals involved in the event or the video stream 202 from which the highlight 220 was obtained, such as teams, players, coaches, anchors, broadcasters, and fans, and/or the like.

The metadata 224 for each highlight 220 may include an excitement level 226 and one or more categories 228, like the metadata 204. However, the excitement level 226 and categories 228 for a highlight 220 need not necessarily be the same as the excitement level 206 and categories 208 for the event 200 from which the highlight 220 is obtained. For example, the highlight 220 may represent the most exciting part of a sporting event, and therefore the excitement level 226 for the highlight 220 may be higher than the excitement level 206 for the event 200 from which the highlight 220 was obtained. Similarly, the event 200 may involve players, coaches, fans, or other individuals not present in the highlight 220, and may have other categorizable parameters that differ from those of the highlight 220. Thus, the categories 228 for a highlight 220 may be different from the categories 208 for the event 200 from which the highlight 220 was obtained.

As further shown, the template database 165 may include a variety of templates that can be compared with video frames of any of the video streams 202 to identify which portions of the video streams 202 should be included in the highlights 220. The template database 165 may include any of a wide variety of templates. In some examples, these templates may include k text templates 230, m logo templates 232, p face templates 234, and/or other templates 236.

The text templates 230 may include a number of text strings (and/or normalized or otherwise modified versions to facilitate identification) to be compared with text extracted from video frames of the video stream 202. The presence of such text may indicate that the portion of the video stream 202 in which it appears should be designated as a highlight. For example, words such as "INSTANT REPLAY," "TOUCHDOWN," "BIRDIE," "INTERCEPTION," and "HOME RUN" may denote a highlight in a video stream 202; such phrases may appear in the text templates 230.

The logo templates 232 may include a number of logos (and/or normalized or otherwise modified versions to facilitate identification) to be compared with logos extracted from the video frames of the video stream 202. The presence of such a logo may indicate that the portion of the video stream 202 in which it appears should be designated as a highlight. For example, a broadcaster logo or a logo pertaining to a score, change of possession, or other significant game event may denote a highlight in a video stream 202; such logos may appear in the logo templates 232.

The face templates 234 may include a number of images of faces (and/or normalized or otherwise modified versions to facilitate identification) to be compared with faces extracted from the video frames of the video stream 202. The faces of the face templates 234 may optionally belong to individuals of interest, such as particular players, coaches, anchors, fans, and/or commentators. Optionally, multiple views of each face may be stored in the face templates 234, including, optionally, views from different angles. The presence of such a face may indicate that the portion of the video stream 202 in which it appears should be designated as a highlight. For example, a face belonging to a celebrity athlete or coach, or a particular commentator, anchor, or fan, may denote a highlight in a video stream 202. Such faces may thus appear in the face templates 234.

The other templates 236 may include any wording, pictures, text, metadata, or other elements that may be identified within a video stream 202 to denote that the portion of the video stream 202 pertains to a highlight.

The data structures set forth in FIG. 2 are merely exemplary. Those of skill in the art will recognize that some of the data of FIG. 2 may be omitted or replaced with other data in the performance of highlight identification. Additionally or alternatively, data not shown in FIG. 2 may be used in the performance of highlight identification.

Computer Vision Techniques

In at least one embodiment, video analysis is performed to identify one or more video frames where a video sequence of interest, such as a highlight, may begin or end. These video frames, referred to as delineators, may contain one or more distinctive visual elements that indicate that a highlight may be starting or ending. Computer vision techniques, and/or other video analysis, can be used to identify such distinctive visual elements.

For example, sports broadcasts often display a distinctive visual element, such as a moving logo or text, to indicate that a replay is being shown. One such visual element can be shown at the beginning of a replay, and another can be shown at the end of the replay. Since a replay usually indicates some occurrence of note, such visual elements can be used to identify delineators for highlights. Other types of delineators can include changes in camera angles, cuts to commentators in a studio, on-screen text, and/or the like. In various embodiments, the described system performs video analysis to detect any or all of these visual delineators so as to identify start and/or end of highlights. Visual delineators can be present in a single frame of video or in multiple frames.

In at least one embodiment, audio analysis can also be used, either to supplement the video analysis or on its own. Audio analysis can include detection of crowd noise, certain words or phrases, changes to background noise, and/or the like. Further descriptions of such techniques are provided in the above-cited related applications.

Figure 3:
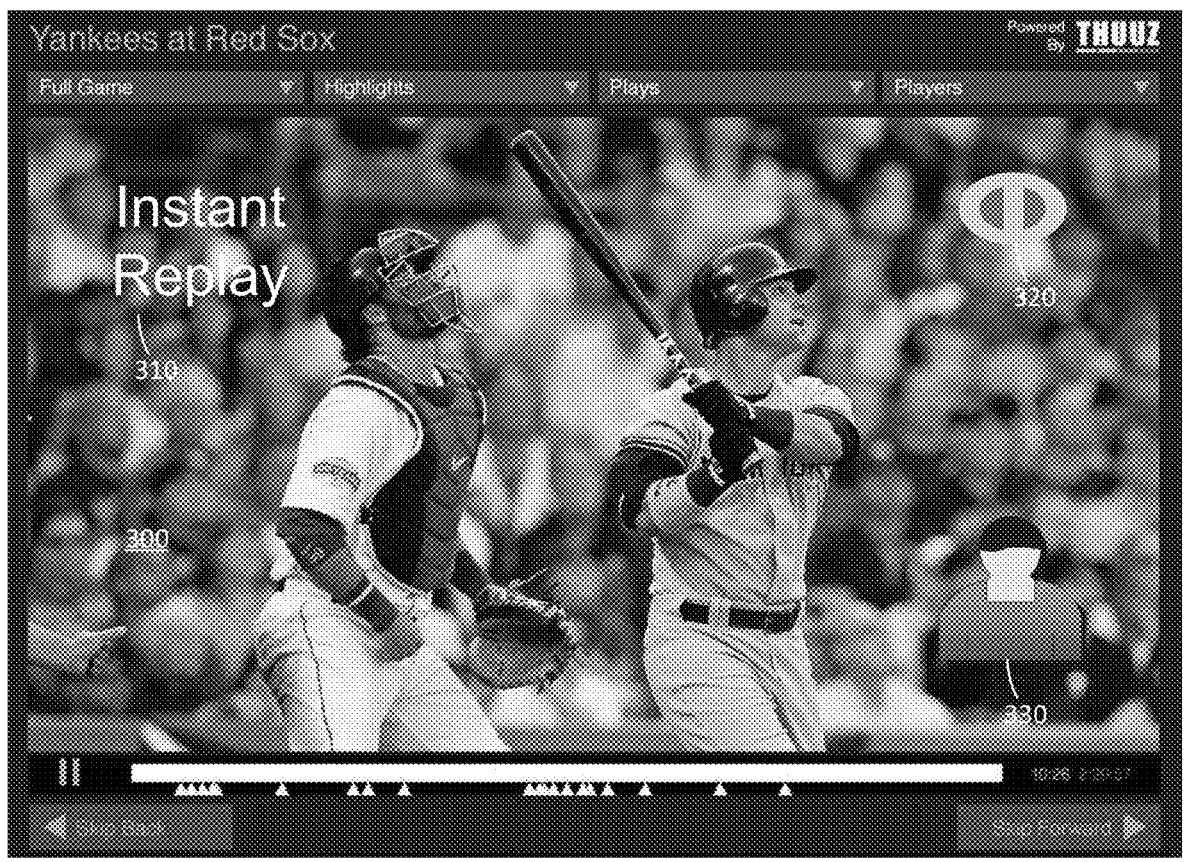
FIG. 3 is a screenshot diagram of a video frame from a video stream, showing some elements within the video frame that may be compared to the template database to identify the highlights, according to one embodiment.

FIG. 3 is a screenshot diagram of a video frame 300 from a video stream 202, showing some elements within the video frame 300 that may be compared to the template database 165 to identify delineators and thereby determine start and/or end of highlights 220, according to one embodiment. Although FIG. 3 depicts a number of visual elements in combination with one another, one skilled in the art will recognize that delineators can be identified based on any one of such elements (and/or other video elements), within a video frame. In the example shown, the video frame 300 may contain text 310 indicating what is being depicted in the video frame, a logo 320 pertaining to a broadcaster of the video stream 202, or a game event, depicted in the video frame, and/or a face 330 belonging to a commentator, providing narrative regarding the contents of the video frame. The text 310 may be compared with the text templates 230, the logo 320 may be compared with the logo templates 232, and the face 330 may be compared with the face templates 234. If any comparison results in a match, the video frame 300 may be identified as a content delineator indicating the presence of a highlight. As will be discussed in further detail below, a content delineator may indicate the start or end of a highlight, and may be part of the highlight, or may occur prior to or after the highlight.

In some embodiments, such comparison may be carried out with respect to each video frame 300 of a video stream 202. Alternatively, such comparison may only be carried out on some video frames 300 (for example, every 10th, 20th, 30th, 40th, or 50th frame). Once a video frame 300 is identified as a content delineator, the adjacent video frames may be processed, if needed, in order to locate the beginning or the end of the highlight 220. For example, a logo 320 may be displayed for fifty frames immediately prior to the start of a replay. The video frame 300 in which the logo 320 is first identified may not be the last frame of the fifty. Accordingly, further processing of adjacent frames may be needed to discover the actual start of the highlight (for example, the video frame 300 immediately following the fifty in which the logo 320 is displayed). Many other processing schemes may be employed, as would be apparent to a person of skill in the video processing arts.

In at least one embodiment, when at least one delineator is identified, based on some visual element that is found in one or more frames, the start and end of a highlight can be determined to be the sequence of frames that appear between two identified delineators. In another embodiment, the start of the highlight can be determined based on identification of a delineator, and the end can be determined by other means; conversely, the end of the highlight can be determined based on identification of a delineator, and the start can be determined by other means.

The text 310, logo 320, and/or face 330 are only examples of characteristics of a video frame 300 that may be automatically identified by the system 300 to locate a content delineator. Other characteristics may be used in addition to, or in the alternative to, the foregoing. For example, slow-motion footage may indicate the presence of a highlight. Various video analysis techniques may be used to analyze a video to ascertain whether motion has been slowed. For example, adjacent video frames 300 may be compared with each other, and if the frames of a video segment show less change between adjacent frames than an average level for the video stream, the video segment may be deemed likely to show slow-motion footage. Such slow-motion footage may be a content delineator indicating the presence of a highlight, in particular, for the video frames 300 in which it occurs.

Highlight Identification

Figure 4:
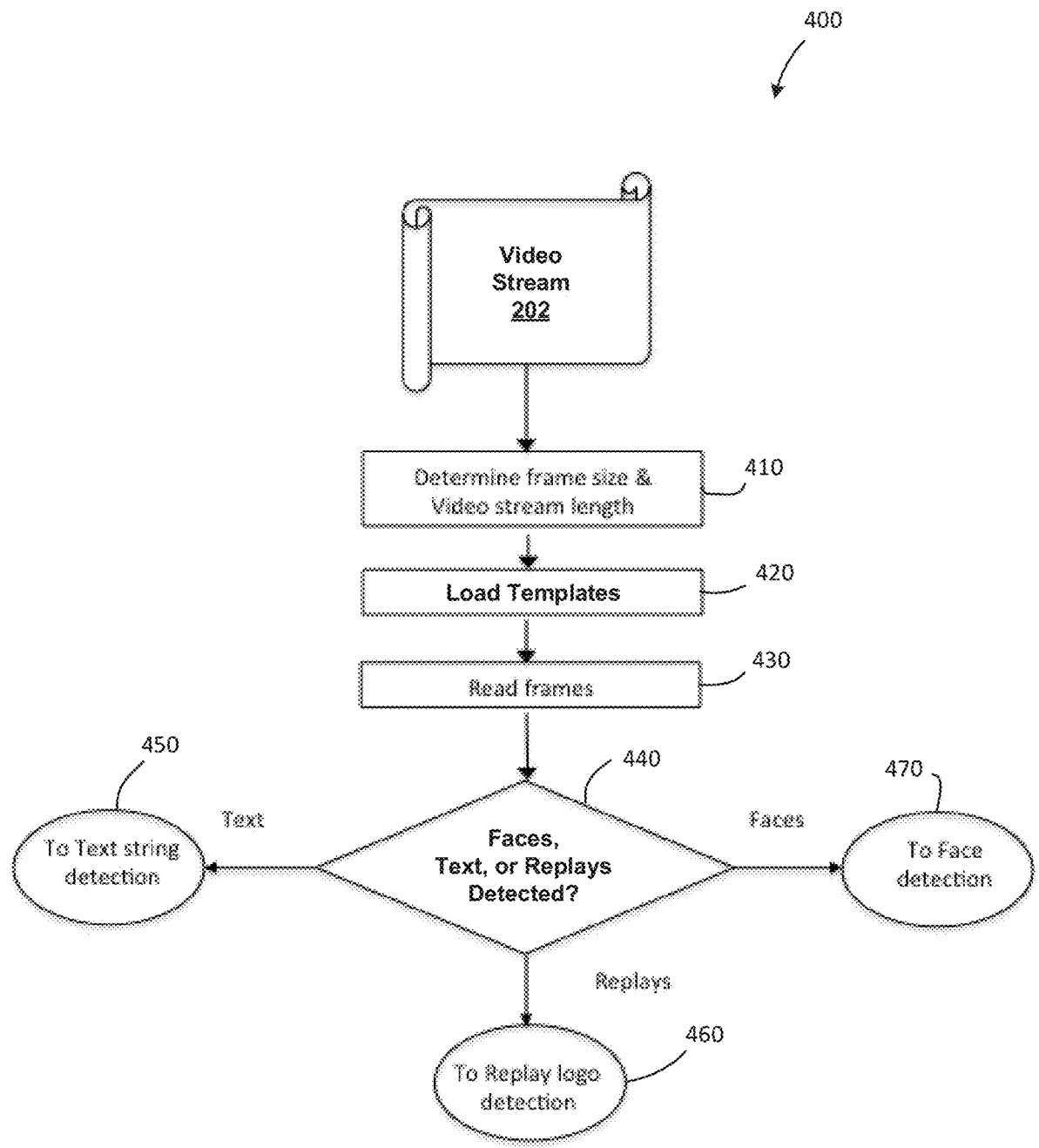
FIG. 4 is a flowchart depicting a method for performing on-the-fly processing of video frames for detection and recognition of characteristic content such as replay network/team logos, various faces of interest, and/or characteristic text associated with sports newsroom banners and network identifiers, according to one embodiment.

FIG. 4 is a flowchart depicting a method 400 carried out by an application, for example, running on one of the client devices 106 and/or the analytical servers 116, that receives a video stream 202 and performs on-the-fly processing of video frames 300 for detection and recognition of characteristic contents. The characteristic contents of interest are replay network/team logos, various faces of interest, and/or characteristic text associated with sports newsroom banners and network identifiers, according to one embodiment. The system 100 of FIG. 1A will be referenced as the system carrying out the method 400 and those that follow; however, alternative systems, including but not limited to the system 160 of FIG. 1B, the system 180 of FIG. 1C, and the system of FIG. 1D, may be used in place of the system 100 of FIG. 1A.

In a step 410, the system 100 may obtain information regarding the video stream 202 to be processed. Such information may include the size of the video frames 300 of the video stream 202, the length of the video stream 202, and/or the like.

In a step 420, the system 100 may load templates from the template database 165. This step 420 may prepare the system to compare the templates of the template database 165 with the video frames 300 of the video stream 202.

In a step 430, the system 100 may read one or more video frames 300 of the video stream 202 to be compared with the template database 165.

In a query 440, a determination may be made as to whether faces, text, or logos are detected within the video frame 300. If text 310 is detected, the method 400 may proceed to a step 450 in which text string detection is initiated. If one or more logos 320 are detected, the method 400 may proceed to a step 460 in which logo detection (for example, a logo indicating a replay) is initiated. If one or more faces 330 are detected, the method 400 may proceed to a step 470 in which face detection is initiated.

In various embodiments, the system 100 automatically recognizes characteristics of content delineators that indicate the start and/or end of selected events or segments to be assembled into comprehensive highlights with associated textual and/or audiovisual metadata. Such content delineators may include, for example, transition frames that appear before the start of a highlight and/or after the end of a highlight, and may thus mark one or both ends of the highlight, without actually being part of the highlight. In other embodiments, such content delineators may be positioned immediately after the start, and/or before the end, of the highlight, and may thus mark one or both ends of the highlight, and be part of the highlight. In this manner, content delineators such as transition frames may serve to indicate start or end of a highlight.

In yet other embodiments, the characteristics of a highlight may persist throughout the duration of the highlight. For example, text reading "INSTANT REPLAY" may be present for the duration of a replay, and may thus demarcate not only the start and/or end of the highlight, but the entire length of the highlight. In such embodiments, the video frame(s) 300 in which the characteristic(s) (i.e., text, logo, or face) appears may be content delineators indicating the start of the highlight, and the video frame(s) 300 in which the characteristic(s) disappears may be content delineators indicating the end of the highlight.

Available choices for rendering of highlights can be based on any or all of:
- detection/extraction of replay sequences;
- detection/extraction of faces and video sequence rendering based on recognized faces; and/or
- text detection and extracted video sequence rendering based on recognized characteristic repetitive text. All of these techniques are described in more detail herein.

Detection/Extraction of Replay (Network Repeat/Replay) Video Sequences

In various embodiments, the system 100 can identify video content by capturing video data (such as one or more video frames 300) from the video stream 202, processing a plurality of video frames 300 from the captured video content, detecting replay video sequences, and generating a stream of replay video clips. In at least one embodiment, metadata 224 can be included in association with each of the highlights 220, as described previously.

Detection of replay video sequences may occur entirely locally on any client device 106, such as a TV, STB, mobile device, and/or on a remote video server (such as the analytical server(s) 116) with broadcast video ingestion and streaming capability; any of these can be performed in combination with one another.

In various embodiments, video sequence delineation may be performed with full frame network logos as well as with logos embedded within video frames of variable size sweeping the live programming background. Such features often indicate the start and/or end of a replay video sequence. A detected logo 320 can also be tracked over multiple frames in order to reinforce the matching decision logic.

Figure 5:
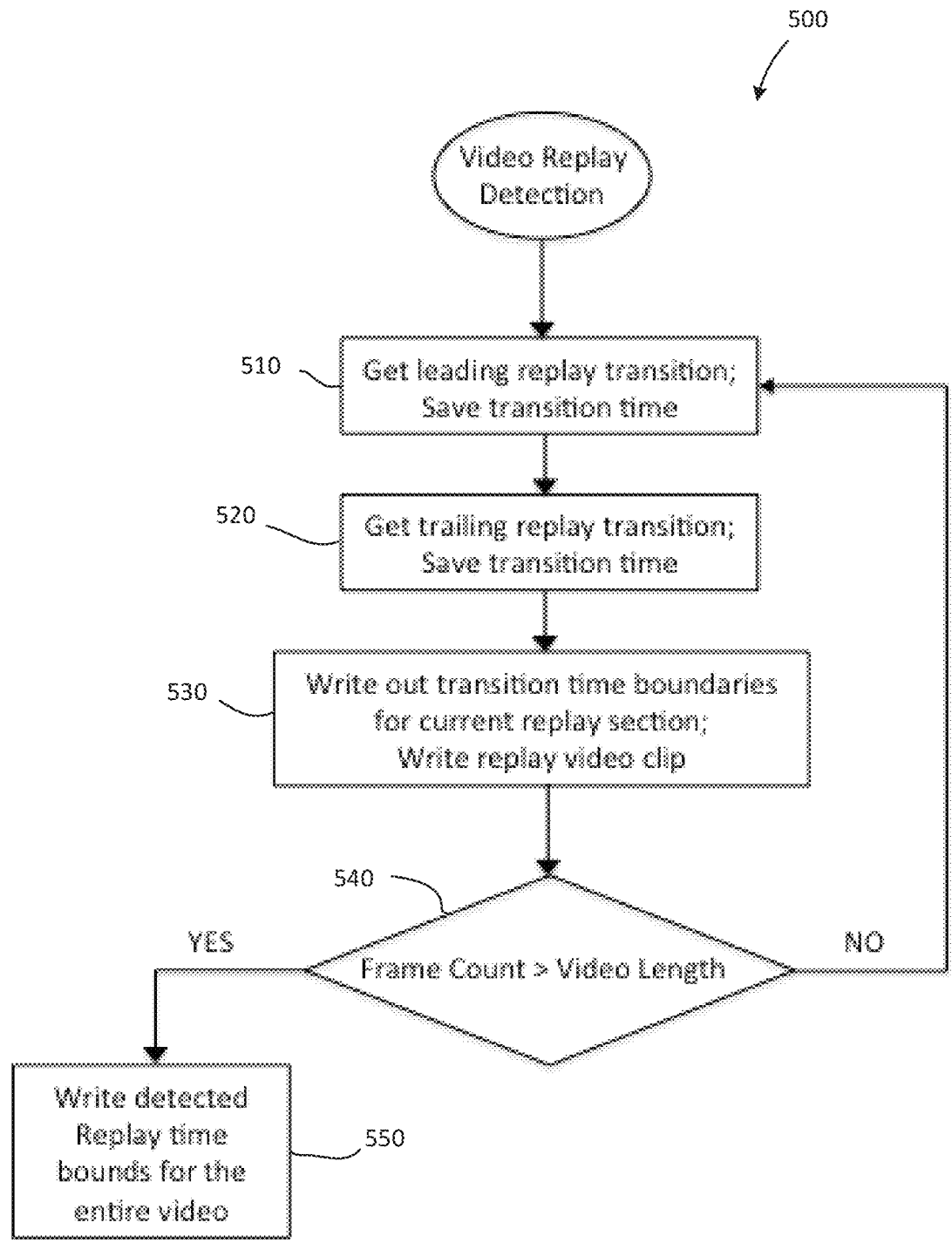
FIG. 5 is a flowchart depicting a method for detection and extraction of a replay video sequence, according to one embodiment.

FIG. 5 is a flowchart depicting a method 500 for detection and extraction of a replay video sequence, according to one embodiment. Video frames 300 may first be analyzed for the presence of leading network/team logo in a step 510. Once a leading network/team logo has been detected, the search (analysis) process may be interrupted, and the transition time may be saved in a buffer. Next, the following video frames may be analyzed for a trailing network/team logo presence. Once the trailing network/team logo is detected, the search (analysis) is interrupted, and the transition time is saved in a buffer in a step 520. Once leading and trailing network/team logos have been detected and transition times recorded, the first replay sequence may be extracted and recorded in a temporary buffer in a step 530. This process is repeated until the entire video stream is exhausted, pursuant to a query 540. The detected replay bounds for the entire highlight may be recorded, for example, as an identifier 223 of the highlight 220, in a step 550. Successful identification of the leading and trailing logos encompassing a replay sequences may trigger an action (not shown) to insert additional information. The additional information may be maintained in the same repository as the network/team logo templates, for example, in the highlight data 164.

Figure 6:
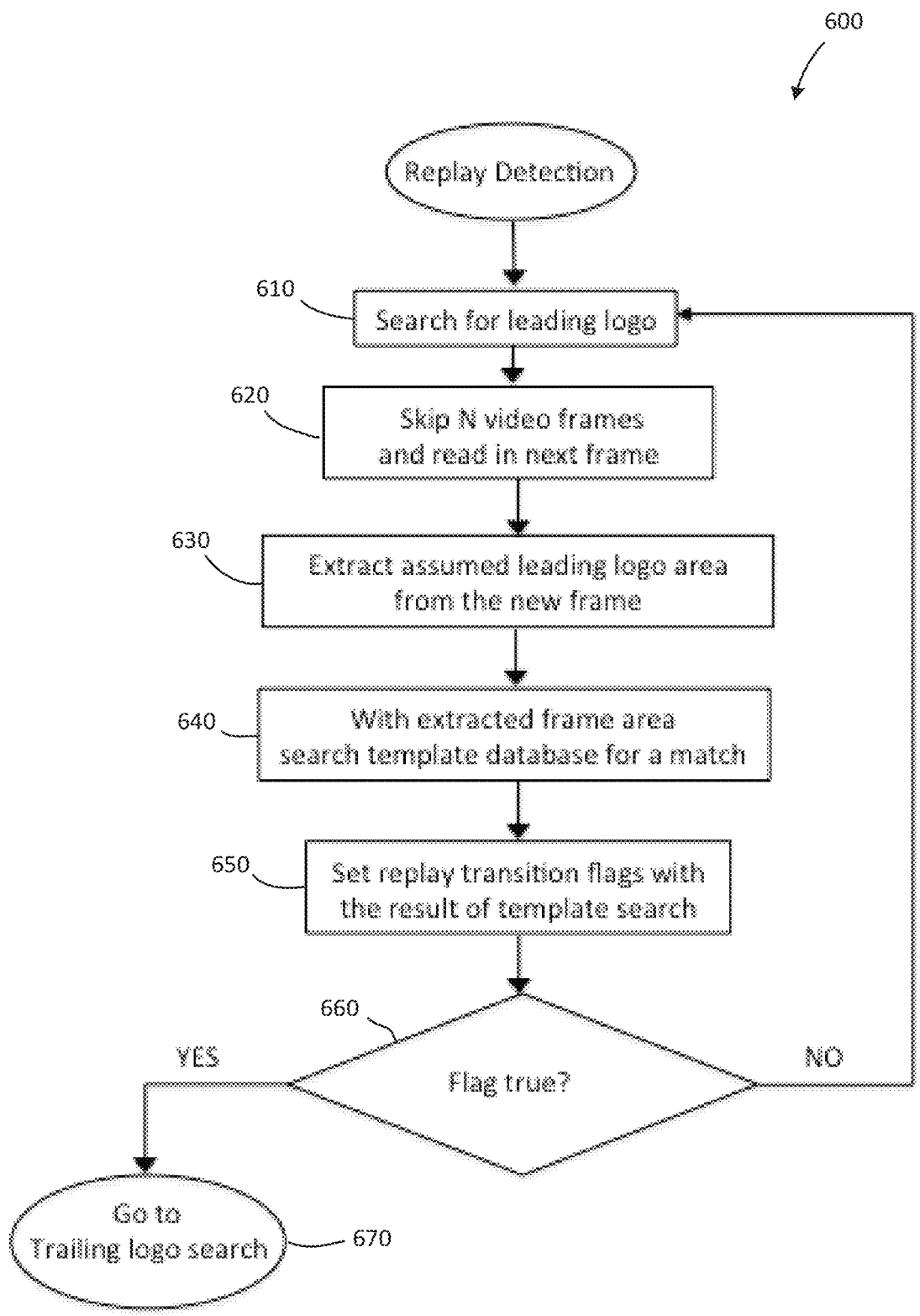
FIG. 6 is a flowchart depicting, in more detail, a method for leading network/team logo search and detection, according to one embodiment.

FIG. 6 is a flowchart depicting, in more detail, a method 600 for leading network/team logo search and detection, according to one embodiment. In a step 610, incoming frames may be processed to search for a leading logo. This may be done in sequential order or on a schedule, with one or more frames optionally skipped in a step 620, depending on the way the logo templates 232 are formed, and on whether reliable logo detection can be performed based on sparse incoming frame processing. Each captured video frame selected for analysis is first resized and cropped to the area, or multiple areas, where it is assumed the network/team logo would appear, in a step 630. The cropped area is extracted and subsequently compared, in a step 640, with a number of template logo images of the same size, which may be retrieved from the template database 165, and more specifically, from the logo templates 232. In at least one embodiment, the logo templates 232 for the leading and trailing network/team logos may be identical, if there is no distinction between leading and trailing network/team logos. When the comparison of assumed frame area and a logo image from the logo templates 232 results in a match, the matching process may be interrupted, and the position of the frame containing the valid leading logo and the associated time may be recorded. Subsequently, in a step 650, a flag is set, indicating that the leading logo has been detected, and the system 100 may answer a query 660 in the affirmative, and then proceed to trailing logo search and identification in a step 670.

Figure 7:
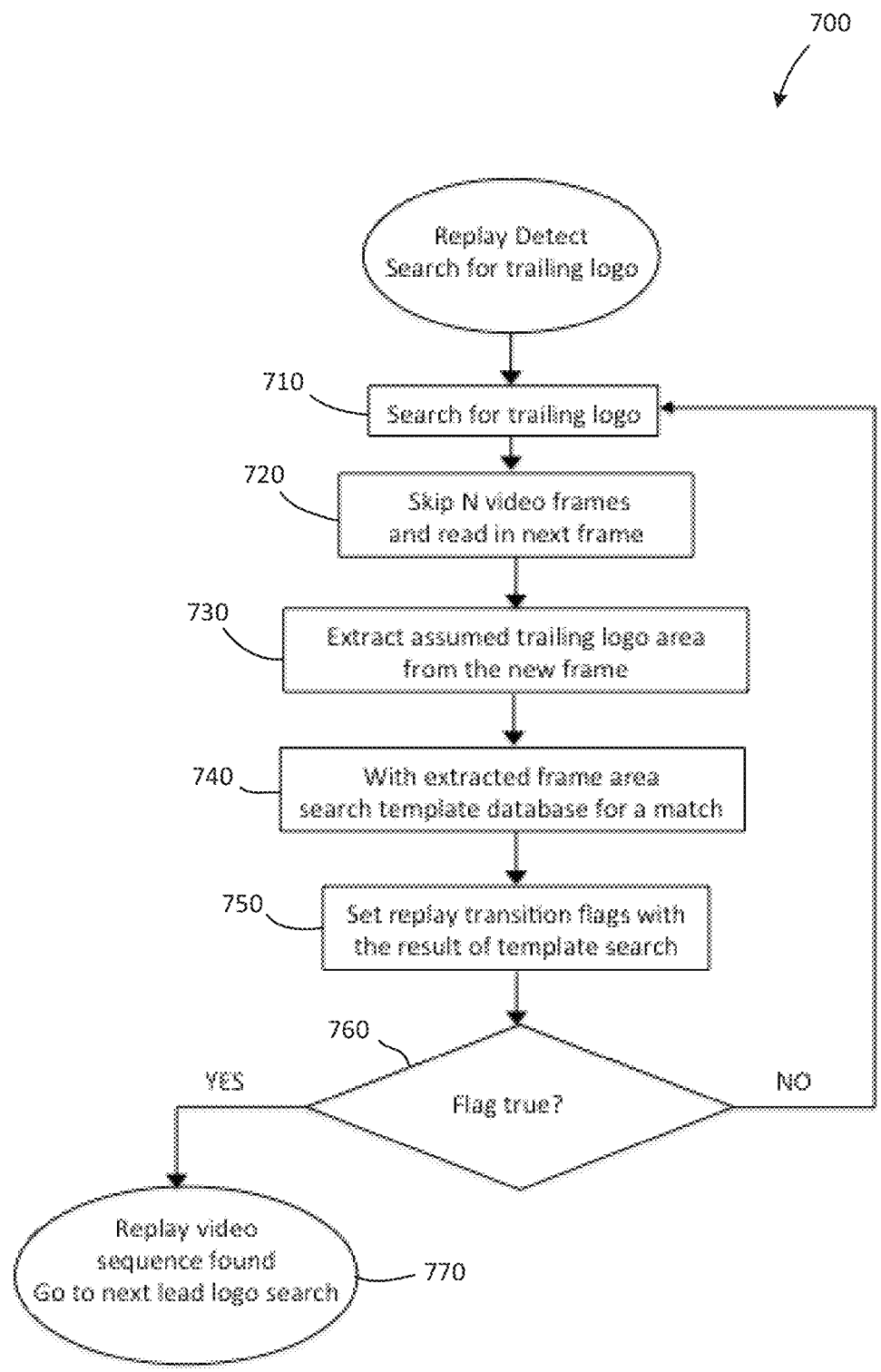
FIG. 7 is a flowchart depicting, in more detail, a method for trailing network/team logo search and detection, according to one embodiment.

FIG. 7 is a flowchart depicting in more detail the method 700 for trailing network/team logo search and detection, according to one embodiment. As described above, in connection with FIG. 6, incoming frames following the leading logo position may be processed in a step 710 in sequential order, or on a schedule, with one or more frames skipped, depending on how the logo templates 232 were formed, and depending on whether reliable logo detection can be performed on sparse sampling of incoming frames. Each captured video frame selected for analysis may first be resized and cropped to the area, or multiple areas, where it is assumed the trailing network/team logo would appear, in a step 730. In a step 740, the cropped area may be extracted and subsequently compared with a number of logo templates 232 of the same size, which may be retrieved from the template database 165. In at least one embodiment, the logo templates 232 for the leading and trailing network/team logos may be identical. When the comparison of assumed frame area and a logo image from the logo templates 232 results in a match, the matching process is interrupted, and the position of the frame containing the valid trailing logo and the associated time are recorded. Subsequently, in a step 750, a flag may be set, indicating that the trailing logo has been detected and the system 100 may answer a query 760 in the affirmative, and the process of replay detection may be complete for the current identified replay sequence. Subsequently, the replay video sequence may be extracted and the system 100 may proceed, in a step 770, to new leading logo search and identification.

Detection/Extraction of Video Sequences Based on Face Detection/Recognition

In at least one embodiment, analysis of captured video frames is performed to detect faces, which are subsequently processed for comparison with pre-processed faces residing in the face templates 234 of the template database 165. Multiple faces can be detected/extracted in an incoming video frame, and attempts may be made to match at least one of them to faces in the face templates 234. As indicated previously, the template database 165 may reside on the TV, STB, video server, and/or mobile device. Successful identification of a face in a captured frame may trigger an action within the application that handles generation of highlights 220 and metadata 224 associated with the highlights 220.

In various embodiments, detection of video sequences containing faces of anchors, commentators, fans, and/or celebrities may occur entirely locally on a client device 106 such as a TV, STB, or mobile device, and/or on a remote video server, such as the analytical server(s) 116, with broadcast video ingestion and streaming capability. Any of the above can be performed in combination with one another.

Figure 8:
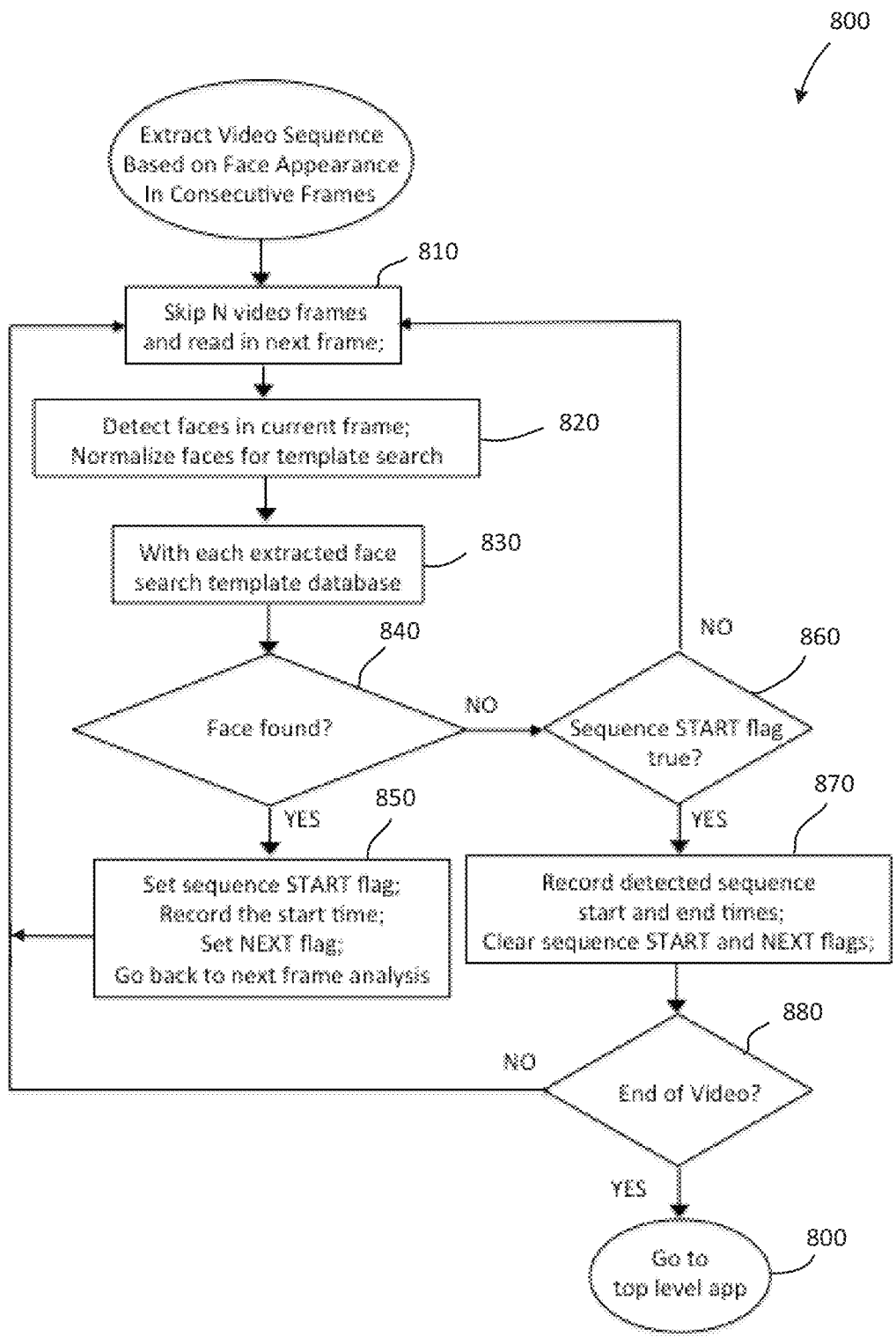
FIG. 8 is a flowchart depicting, in more detail, a method for conducting face recognition, according to one embodiment.

FIG. 8 is a flowchart depicting, in more detail, a method 800 for conducting face recognition, according to one embodiment. First, a video frame 300 is selected for processing, or an option is chosen to process each video frame 300 in succession. If the option to process each video frame 300 in succession is not chosen, then N video frames 300 may be skipped in a step 810. If any faces 330 are detected in the video frame in a step 820, they may be extracted and normalized to the size and illumination of the faces 330 residing in the face templates 234. Subsequently, in a step 830, each detected face 330 may be compared against the faces templates 234 residing in the template database 165. If a match is detected, pursuant to a query 840, the process of template matching may be interrupted, and in a step 850, a START flag may be set, indicating the beginning of a highlight 220. The corresponding start time may be recorded. The NEXT flag may be set to allow for recording of the end of the highlight 220. The method 800 may return to the step 810.

If, pursuant to the query 840, a face 330 is not found in the video frame 300 under review, a query 860 may determine whether the sequence START flag has been set. If not, the method 800 may return to the step 810. If the sequence START flag has been set, then, in a step 870, the start and end times of the highlight 220 may be recorded, for example, in the identifiers 223 for the highlight 220. The START and NEXT flags may be cleared. Then, pursuant to a query 880, if the end of the video stream 202 has been reached, the method 800 may end. Otherwise, the method 800 may return to the step 810.

It should be noted that there are at least two possible ways to identify highlights 220 in connection with the described method. One option is to record a highlight 220 with persistent presence of the same face 330 over a multiple of video frames 300; the other is to identify a highlight 220 based on two disconnected appearances of the same face 330.

Detection/Extraction of Video Sequences Based on Repetitive TextStrings Detection In at least one embodiment, analysis of captured video frames is performed to detect repetitive strings of text (repetitive text boxes), which are subsequently processed for comparison with the text templates 230, which may be pre-processed text boxes residing in the template database 165. The text templates 230 may represent text associated with sports newsroom banners, network identifiers, and/or the like. Multiple text boxes can be detected/extracted in an incoming video frame, and attempts may be made to match at least one of them to a text template 230 in the template database 165. As mentioned previously, the template database 165 can reside on a client device 106 such as the TV, STB, or mobile device, or on a video server, such as the analytical server(s) 116. Successful identification of text 310 in a video frame 300 may trigger an action within the application that handles identification of highlights 220 and metadata 224 associated with the highlights 220.

In various embodiments, identification of highlights 220 containing text 310 associated with sports newsroom banners and network identifiers may occur entirely locally on client devices such as the TV, STB, or mobile device, and/or on a remote video server, such as the analytical server(s) 116, with broadcast video ingestion and streaming capability. Any of the above can be performed in combination with one another.

Figure 9:
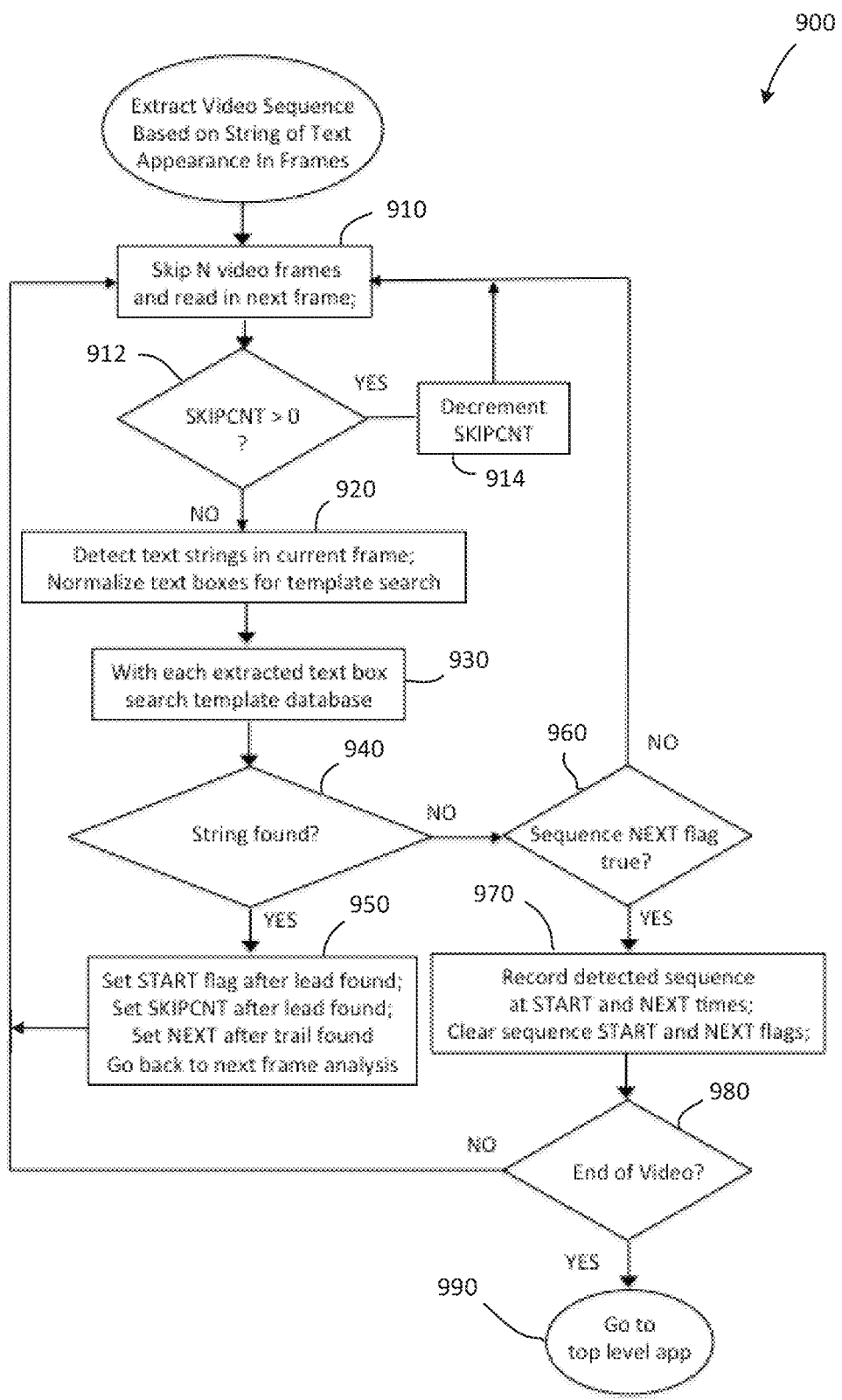
FIG. 9 is a flowchart depicting, in more detail, a method for text identification in more detail, according to one embodiment.

FIG. 9 is a flowchart depicting in more detail a method 900 for text identification, according to one embodiment. First, a video frame 300 is selected for processing, or an option is chosen to process each video frame in succession. If such an option is not selected, a determination may be made in a step 910 to skip N video frames 300, and the next video frame 300 may be read. Pursuant to the step 910, a query 912 may determine whether the count of frames to be skipped (SKIPCNT) has been achieved; i.e., SKIPCNT is greater than zero. If so, in a step 914, SKIPCNT may be decremented, and the step 910 may be repeated. Once SKIPCNT has reached zero, the method 900 may proceed to a step 920. A similar method of skipping a desired number of video frames 300 may be used in any method in which video frames 300 are to be skipped for analysis.

Pursuant to the step 920, if any text boxes (i.e., text 310) of certain size are detected, they are extracted and normalized to the size and illumination of text boxes in the text templates 230. Subsequently, in a step 930, each detected text 310 is compared against the text templates 230 residing in the template database 165. If a match is detected pursuant to a query 940, then in a step 950, the process of template matching may be interrupted, and a START flag may be set indicating the beginning of a highlighted 220. The corresponding start time may be recorded. The NEXT flag may be set to allow for recording of the end of the highlighted 220. The method 900 may return to the step 910.

If, pursuant to the query 940, text 310 is not found in the video frame 300 under review, a query 960 may determine whether the sequence NEXT flag has been set. If not, the method 900 may return to the step 910. If the sequence NEXT flag has been set, then in a step 970, the start and end times of the highlight 220 may be recorded, for example, in the identifiers 223 for the highlight 220. The START and NEXT flags may be cleared. Then, pursuant to a query 980, if the end of the video stream 202 has been reached, the method 900 may end, and pursuant to a step 990, the method 900 may return to a top-level app. If the query 980 is answered in the negative, the method 900 may return to the step 910.

In at least one embodiment, the system 100 uses identified text 310 in the video stream 202 to delineate the highlight 220 as the one between two appearances of identical or non-identical text 310. By skipping multiple frames after text 310 is detected, and before proceeding to detection of trailing text 310, the system 100 may avoid detection of the same text 310 in successive video frames 300. The highlight 220 may then be taken between two instances of text 310 that occur a few seconds apart. In this manner, the highlight 220 may be defined based on two disconnected appearances of text 310 associated with sports newsroom banners, network identifiers, and/or the like.

Template Matching Process

Figure 10:
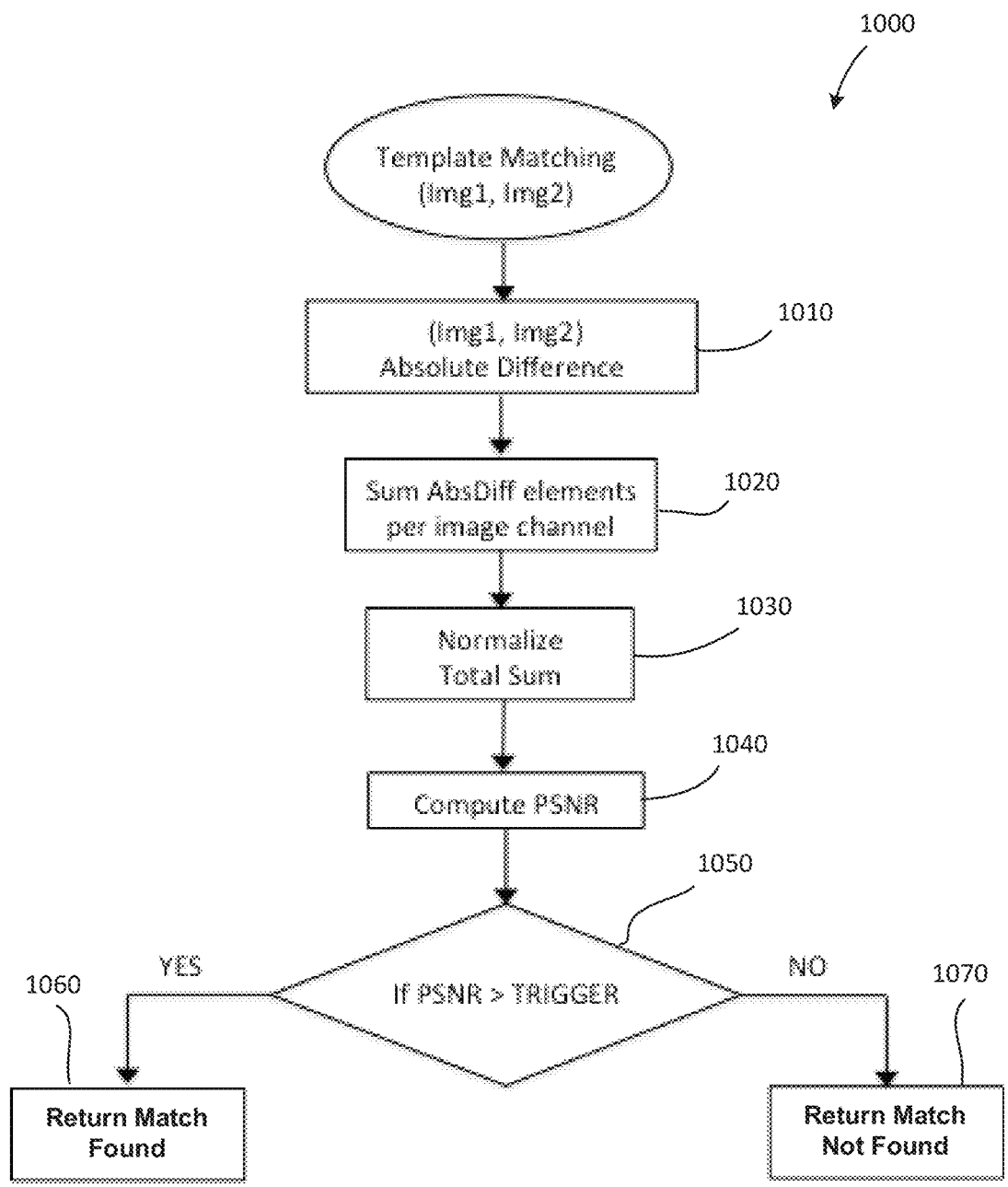
FIG. 10 is a flowchart depicting a method for template matching that may be used in event boundary detection, according to one embodiment.

FIG. 10 is a flowchart depicting a method 1000 for template matching that may be used in event boundary detection, according to one embodiment. In a step 1010, text 310, a logo 320, or a face 330 may be compared with the corresponding templates of the template database 165 (the text templates 230, the logo templates 232, and the face templates 234). For each comparison, an absolute difference is computed separately for each image channel, and then a total sum is generated in a step 1020. The total sum is then normalized in a step 1030, and PSNR is computed in a step 1040. This PSNR may subsequently be used to determine, in a query 1050, whether sufficient similarity exists between the extracted text 310, logo 320, or face 330, and the text templates 230, the logo templates 232, or the face templates 234, respectively. If sufficient similarity exists, then in a step 1060, the method 1000 may return an indication that a match has been found. If not, then in a step 1070, the method 1000 may return an indication that no match was found. One skilled in the art will recognize that this template matching technique is merely exemplary, and that other matching processes can be used.

Template Database Formation

Figure 11:
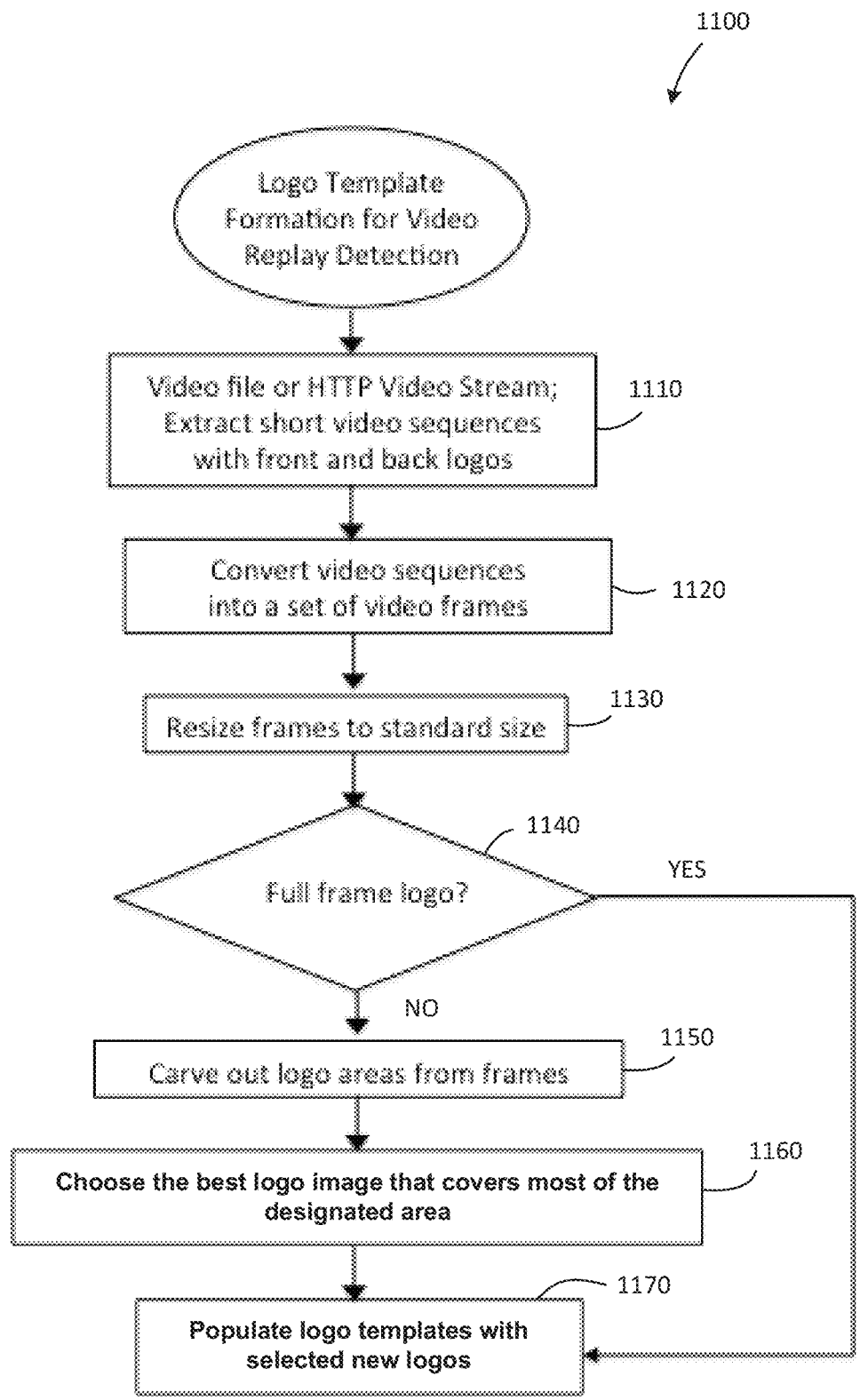
FIG. 11 is a flowchart depicting a method for forming the logo templates of the template database, according to one embodiment.

FIG. 11 is a flowchart depicting a method 1100 for forming the logo templates 232 of the template database 165, according to one embodiment. The logo templates 232 may be obtained from video streams 202 of a type similar to that in which the highlights 220 are to be identified.

The method 1100 may commence with a step 1110 in which short video sequences with front and back logos are extracted from one or more video streams 202. In a step 1120, the video sequences may be converted into a set of video frames 300. In a step 1130, the video frames 300 may be resized to standard size. In a query 1140, a determination may be made as to whether the video frames 300 contain a full frame logo. If not, in a step 1150, logo areas may be carved out from the video frames 300. Then in a step 1160, the best logo image that covers the designated area may be selected. In a step 1170, the logo templates 232 may be populated with the selected new logos. If the query 1140 is answered in the affirmative, the step 1150 and the step 1160 may be omitted and the full frame logo may be added to the logo templates 232.

Figure 12:
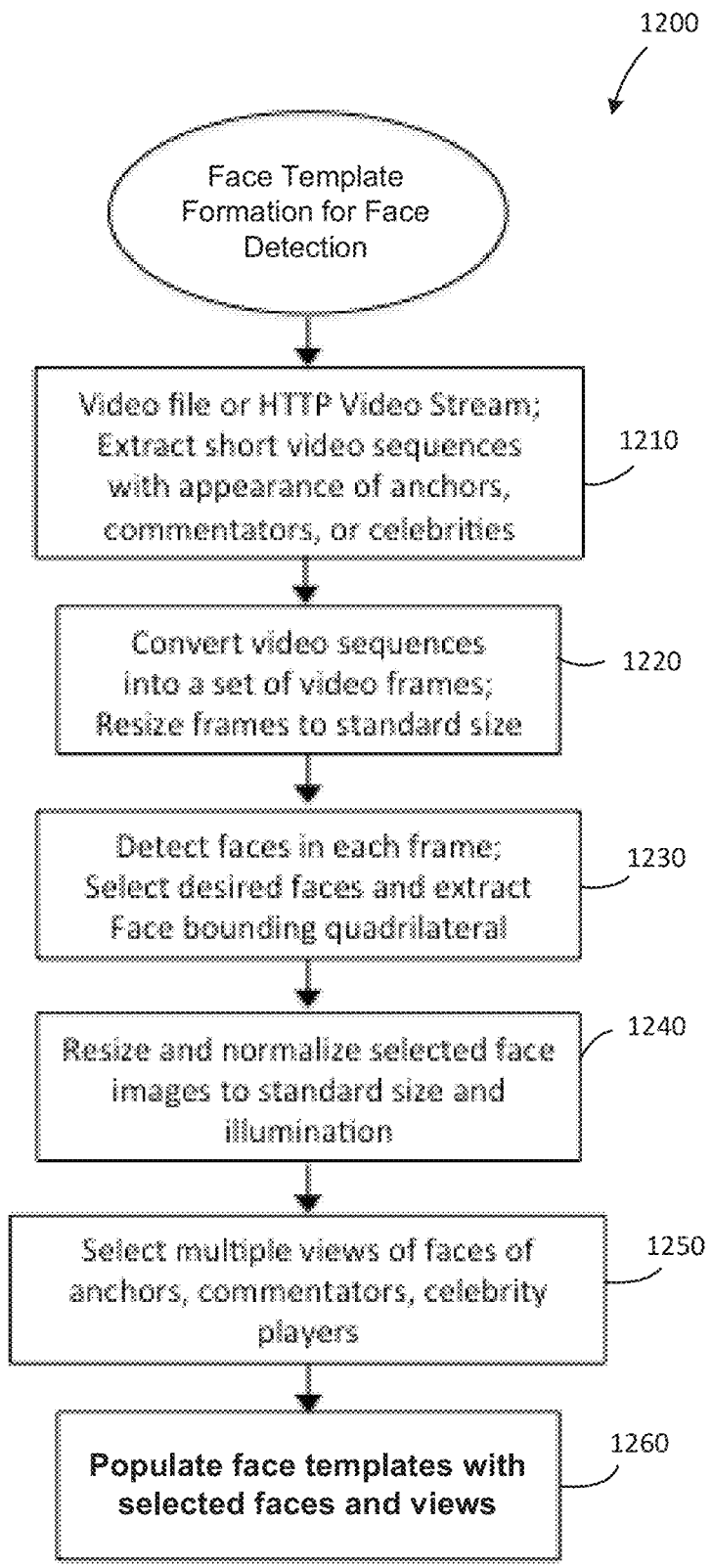
FIG. 12 is a flowchart depicting a method for forming the face templates of the template database, according to one embodiment.

FIG. 12 is a flowchart depicting a method 1200 for forming the face templates 234 of the template database 165, according to one embodiment. The face templates 234 may be obtained from video streams 202 of a type similar to that in which the highlights 220 are to be identified.

The method 1200 may commence with a step 1210 in which short video sequences depicting faces of individuals of interest are extracted from one or more video streams 202. In a step 1220, the video sequences may be converted into a set of video frames 300 and resized to standard size. In a step 1230, faces may be detected in each of the video frames 300; the desired faces may be extracted in bounding quadrilaterals. In a step 1240, the extracted face images may be resized and normalized to a standard size and illumination. In a step 1250, multiple views of the faces may be selected. In a step 1260, the face templates 234 may be populated with the selected new, normalized face images.

Figure 13:
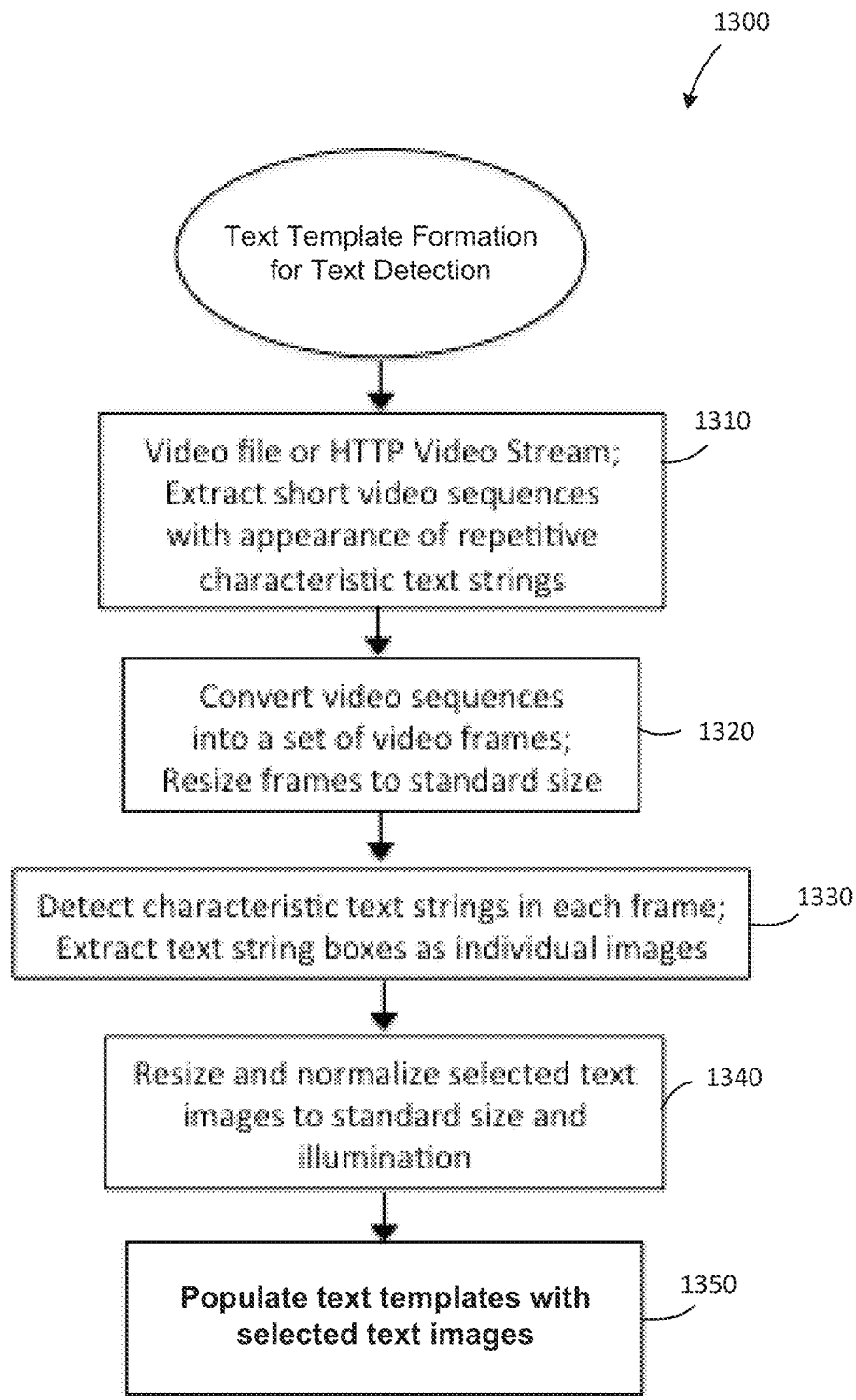
FIG. 13 is a flowchart depicting a method for forming the text templates of the template database, according to one embodiment.

FIG. 13 is a flowchart depicting a method 1300 for forming the text templates 230 of the template database 165, according to one embodiment. The text templates 230 may be obtained from video streams 202 of a type similar to that in which the highlights 220 are to be identified.

The method 1300 may commence with a step 1310 in which short video sequences with repetitive characteristic text strings are extracted from one or more video streams 202. In a step 1320, the video sequences may be converted into a set of video frames 300 and resized to standard size. In a step 1330, characteristic text strings may be extracted from each video frame 300, and text boxes may be extracted as individual images. In a step 1340, the extracted text images may be resized and normalized to a standard size and illumination. In a step 1350, the text templates 230 may be populated with the selected new, normalized text images.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic, described in connection with the embodiments, is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on, and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk, including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct a more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include a processor, an input device such as a keyboard, mouse, touchpad, track pad, joystick, trackball, microphone, and/or any combination thereof, an output device such as a screen, speaker, and/or the like, memory, long-term storage such as magnetic storage, optical storage, and/or the like, and/or network connectivity. Such an electronic device may be portable or nonportable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for identifying one or more highlights of a video stream of an event, the method comprising:
    identifying at least a portion of video frames of a video stream;
    at a processor, comparing the portion of the video frames of the video stream with a plurality of templates stored in a template database, wherein the plurality of templates comprises a plurality of text templates, a plurality of face templates, and a plurality of logo templates, wherein comparing the portion of the video frames with the plurality of templates comprises:
        identifying an element displayed on at least one video frame in the portion of the video frames,
        determining a type of element associated with the element, wherein the type of element is selected from a first group comprising a text element, a face element, and a logo element,
        identifying a set of templates related to the type of element, the set of templates selected from a second group comprising the plurality of text templates, the plurality of face templates, and the plurality of logo templates, and
        comparing the element with the set of templates;
    determining that a subset of the video stream is a highlight based on the subset of the video stream matching at least one template of the set of templates, the determining comprising:
        detecting a leading logo and recording a first transition time corresponding to the leading logo, and
        detecting a trailing logo and recording a second transition time corresponding to the trailing logo;
    based on the determining, extracting the subset of the video stream in between the first transition time and the second transition time from the video stream;
    storing at least one of:
        the subset of the video stream corresponding to the highlight;
        an identifier that identifies the highlight within the video stream; and
        metadata pertaining particularly to the highlight;
    determining whether a current frame count of the video stream exceeds a video length of the video stream; and in response to determining that the current frame count exceeds the video length:
    storing a plurality of transition times for a plurality of highlights including the first transition time and the second transition time for the highlight.

2. The method of claim 1, further comprising, causing an output device to output the video stream concurrently with comparison of the portion of the video stream with the plurality of templates.

3. The method of claim 1, wherein:
the highlight is a portion of the plurality of highlights; and
storing the highlight, the identifier, and the metadata comprises storing a highlight reel comprising the plurality of highlights arranged to play in a predefined order.

4. The method of claim 1, wherein:
the highlight is a portion of the plurality of highlights; and
the method further comprises, transmitting, to an output device comprising a mobile device:
a sequence of the plurality of highlights;
the plurality of transition times for the plurality of highlights in the video stream; and
the metadata.

5. The method of claim 1, further comprising, calculating an excitement level corresponding to the highlight, based on how exciting the highlight is expected to be for one or more users;
wherein storing the highlight, the identifier, and the metadata comprises storing, in association with the highlight, the excitement level.

6. The method of claim 5, wherein calculating the excitement level comprises using only objective criteria that do not require access to data specific to any particular user.

7. The method of claim 5, wherein calculating the excitement level comprises utilizing user data specific to a particular user, such that the excitement level is specific to the particular user.

8. The method of claim 5, further comprising:
receiving a user selection of a category pertaining to the highlight, the category selected from the group consisting of:
the excitement level or a range of the excitement levels;
a league of sports teams involved in an event captured in the highlight;
a player involved in the event captured in the highlight;
a season in which the event captured in the highlight occurred; and
transmitting to an output device the highlight based on the user selection.

9. The method of claim 1, wherein:
storing at least one of the highlight, the identifier, and the metadata comprises storing the metadata comprising data from one or more other sources besides the video stream.

10. The method of claim 1, wherein:
comparing the portion of the video stream with the plurality of templates comprises using computer vision techniques to analyze the video frames of the video stream to detect one or more desired content delineators; and
each content delineator indicates at least one of a start and an end of a video sequence.

11. The method of claim 10, wherein using the computer vision techniques to analyze the video frames of the video stream comprises using at least one of boundary detection techniques and PSNR computation to determine whether sufficient similarity exists between an image extracted from one or more of the video frames and a template image of the plurality of templates.

12. The method of claim 10, wherein using the computer vision techniques to analyze the video frames of the video stream comprises identifying the video frames depicting a replay.

13. The method of claim 10, wherein using the computer vision techniques to analyze the video frames of the video stream comprises identifying the video frames showing one or more faces belonging to one or more individuals selected from the group consisting of:
players;
coaches;
anchors;
fans; and
commentators.

14. The method of claim 10, wherein using the computer vision techniques to analyze the video frames of the video stream comprises identifying the video frames showing text that matches a text template of the set of templates.

15. The method of claim 10, wherein using the computer vision techniques to analyze the video frames of the video stream comprises identifying the video frames showing a logo that matches a logo template of the set of templates.

16. The method of claim 15, wherein the logo template is selected from the group consisting of:
a network logo associated with a television, cable, or other broadcast network that provides the video stream; and
a team logo associated with a sports team involved in the event.

17. A non-transitory computer-readable medium for identifying one or more highlights of a video stream of an event, comprising instructions stored thereon, that when executed by a processor, perform operations comprising:
identifying at least a portion of video frames of a video stream;
comparing the portion of the video frames of the video stream with a plurality of templates stored in a template database, wherein the plurality of templates comprises a plurality of text templates, a plurality of face templates, and a plurality of logo templates, wherein comparing the portion of the video frames with the plurality of templates comprises:
    identifying an element displayed on at least one video frame in the portion of the video frames;
    determining a type of element associated with the element, wherein the type of element is selected from a first group comprising a text element, a face element, and a logo element,
    identifying a set of templates related to the type of element, the set of templates selected from a second group comprising the plurality of text templates, the plurality of face templates, and the plurality of logo templates, and
    comparing the element set of templates;
determining that a subset of the video stream is a highlight based on the subset of the video stream matching at least one template of the set of templates, the determining comprising:
    detecting a leading logo and recording a first transition time corresponding to the leading logo, and
    detecting a trailing logo and recording a second transition time corresponding to the trailing logo;

based on the determining, extracting the subset of the video stream in between the first transition time and the second transition time from the video stream;
storing at least one of:
the subset of the video stream corresponding to the highlight;
an identifier that identifies the highlight within the video stream; and
metadata pertaining particularly to the highlight;
determining whether a current frame count of the video stream exceeds a video length of the video stream; and
in response to determining that the current frame count exceeds the video length:
storing a plurality of transition times for a plurality of highlights including the first transition time and the second transition time for the highlight.

18. The non-transitory computer-readable medium of claim 17, wherein the operations further comprise:
causing an output device to output the video stream concurrently with comparison of the portion of the video stream with the plurality of templates.

19. The non-transitory computer-readable medium of claim 17, wherein the operations further comprise:
calculating an excitement level corresponding to the highlight, based on how exciting the highlight is expected to be for one or more users,
wherein storing the highlight, the identifier, and the metadata comprises storing, in association with the highlight, the excitement level.

20. The non-transitory computer-readable medium of claim 17, wherein comparing the portion of the video stream with the plurality of templates comprises:
using computer vision techniques to analyze the video frames of the video stream to detect one or more desired content delineators, each content delineator indicating at least one of a start and an end of a video sequence.

21. The non-transitory computer-readable medium of claim 20, wherein using the computer vision techniques to analyze the video frames of the video stream comprises using at least one of boundary detection techniques and PSNR computation to determine whether sufficient similarity exists between an image extracted from one or more of the video frames and a template image of the plurality of templates.

22. The non-transitory computer-readable medium of claim 20, wherein using the computer vision techniques to analyze the video frames of the video stream comprises identifying the video frames depicting a replay.

23. The non-transitory computer-readable medium of claim 20, wherein using the computer vision techniques to analyze the video frames of the video stream comprises identifying the video frames showing one or more faces belonging to one or more individuals selected from the group consisting of:
players;
coaches;
anchors;
fans; and
commentators.

24. The non-transitory computer-readable medium of claim 20, wherein using the computer vision techniques to analyze the video frames of the video stream comprises identifying the video frames showing text that matches a text template of the set of templates.

25. The non-transitory computer-readable medium of claim 20, wherein using the computer vision techniques to analyze the video frames of the video stream comprises identifying the video frames showing a logo that matches a logo template of the set of templates.

26. A system for identifying one or more highlights of a video stream of an event, comprising:
a processor configured to:
identify at least a portion of video frames of a video stream;
compare the portion of the video frames of the video stream with a plurality of templates stored in a template database, wherein the plurality of templates comprises a plurality of text templates, a plurality of face templates, and a plurality of logo templates, wherein comparing the portion of the video frames with the plurality of templates comprises:
identifying an element displayed on at least one video frame in the portion of the video frames;
determining a type of element associated with the element, wherein the type of element is selected from a first group comprising a text element, a face element, and a logo element,
identifying a set of templates related to the type of element, the set of templates selected from a second group comprising the plurality of text templates, the plurality of face templates, and the plurality of logo templates, and
comparing the element with the set of templates,
determine that a subset of the video stream is a highlight based on the subset of the video stream matching at least one template of the set of templates, the determining comprising:
detecting a leading logo and recording a first transition time corresponding to the leading logo, and
detecting a trailing logo and recording a second transition time corresponding to the trailing logo;
based on the determining, extract the subset of the video stream in between the first transition time and the second transition time from the video stream;
store at least one of:
the subset of the video stream corresponding to the highlight;
an identifier that identifies the highlight within the video stream; and
metadata pertaining particularly to the highlight;
determine whether a current frame count of the video stream exceeds a video length of the video stream; and
in response to determining that the current frame count exceeds the video length:
storing a plurality of transition times for a plurality of highlights including the first transition time and the second transition time for the highlight.

27. The system of claim 26, further comprising an output device configured to output the video stream concurrently with comparison of the portion of the video stream with the plurality of templates.

28. The system of claim 26, wherein the processor is further configured to, calculate an excitement level corresponding to the highlight, based on how exciting the highlight is expected to be for one or more users;
wherein the processor is further configured to store the highlight, the identifier, and the metadata by storing, in association with the highlight, the excitement level.

29. The system of claim 26, wherein the processor is further configured to compare the portion of the video stream with the plurality of templates by using computer vision techniques to analyze the video frames of the video stream to detect one or more desired content delineators, wherein each content delineator indicates at least one of a start and an end of a video sequence.

30. The system of claim 29, wherein the processor is further configured to use the computer vision techniques to analyze the video frames of the video stream by using at least one of boundary detection techniques and PSNR computation to determine whether sufficient similarity exists between an image extracted from one or more of the video frames and a template image of the plurality of templates.

31. The system of claim 26, wherein the processor is further configured to use computer vision techniques to analyze the video frames of the video stream by identifying the video frames depicting a replay.

32. The system of claim 26, wherein the processor is further configured to use computer vision techniques to analyze the video frames of the video stream by identifying the video frames showing one or more faces belonging to one or more individuals selected from the group consisting of:

players;

coaches;

anchors;

fans; and commentators.

33. The system of claim 26, wherein the processor is further configured to use computer vision techniques to analyze the video frames of the video stream by identifying the video frames showing text that matches a text template of the set of templates.

34. The system of claim 26, wherein the processor is further configured to use computer vision techniques to analyze the video frames of the video stream by identifying the video frames showing a logo that matches a logo template of the set of templates.

* * * * *